(12) United States Patent
Policappelli

(10) Patent No.: US 6,727,484 B2
(45) Date of Patent: Apr. 27, 2004

(54) MAKING BEVERAGES AND FOOD IN A MICROWAVE OVEN

(76) Inventor: Nini Policappelli, 361 N. Robertson Blvd., Los Angeles, CA (US) 90048

(*) Notice: Subject to any disclaimer, the term of this patent is extended or adjusted under 35 U.S.C. 154(b) by 0 days.

(21) Appl. No.: 10/390,999

(22) Filed: Mar. 18, 2003

(65) Prior Publication Data

US 2003/0178419 A1 Sep. 25, 2003

Related U.S. Application Data

(60) Provisional application No. 60/366,865, filed on Mar. 21, 2002, provisional application No. 60/146,749, filed on Aug. 2, 1999, provisional application No. 60/103,674, filed on Oct. 9, 1998, and provisional application No. 60/082,053, filed on Apr. 16, 1998.

(51) Int. Cl.$^7$ .................................................. H05B 6/80
(52) U.S. Cl. .................... 219/689; 219/687; 99/306; 426/241
(58) Field of Search ..................... 219/687, 689, 219/725, 729, 730, 734, 735, 759, 762; 426/107, 113, 234, 241; 99/306, 305, 300, 451, DIG. 14

(56) References Cited

U.S. PATENT DOCUMENTS

| | | | | |
|---|---|---|---|---|
| 3,743,520 A | * | 7/1973 | Croner | 426/87 |
| 4,233,325 A | * | 11/1980 | Slangan et al. | 426/107 |
| 4,577,080 A | * | 3/1986 | Grossman | 219/689 |
| 4,596,713 A | * | 6/1986 | Burdette | 426/107 |
| 4,762,056 A | * | 8/1988 | Virag | 99/345 |
| 4,987,280 A | * | 1/1991 | Kanafani et al. | 219/731 |
| 5,064,980 A | * | 11/1991 | Grossman et al. | 219/689 |
| 5,185,505 A | * | 2/1993 | Grzywana | 219/689 |
| 5,243,164 A | * | 9/1993 | Erickson et al. | 219/689 |
| 5,747,782 A | * | 5/1998 | Orrico et al. | 219/689 |
| 5,832,809 A | * | 11/1998 | Gras | 99/299 |
| 5,884,551 A | * | 3/1999 | Orrico et al. | 99/317 |
| 6,229,128 B1 | * | 5/2001 | Policappelli | 219/689 |

FOREIGN PATENT DOCUMENTS

WO     WO 95/19098     * 12/1994

* cited by examiner

Primary Examiner—Philip H. Leung
(74) Attorney, Agent, or Firm—Greenberg Traurig, LLP; Charles Berman, Esq.

(57) ABSTRACT

A system for preparing and cooking edible components in a microwave including different cells or compartments containing different components of the desired consumable product. Under pressure of the microwaves on the components, pressure of one or more components acts to break seals between the cells so that the components can mix and provide a desirable end product, which can be a liquid or solid form. The disposable system can make hot beverages such as espresso and cappuccino in a microwave oven. One of the ingredients can be a dairy product such as milk and the other can be water. One or more of the compartments may be made of a material to contract or expand under heat. This aids in creating or decreasing pressure on the components being processed for cooking. The system contains a substantially non-shrinkable and selectively at least partly opaque member about at least the one component. Expandable components such as a plastic material are located between the non-shrinkable member and the shrinkable member and expansion of the components under microwaves acts to aid the forcing of liquid through the divider.

24 Claims, 35 Drawing Sheets

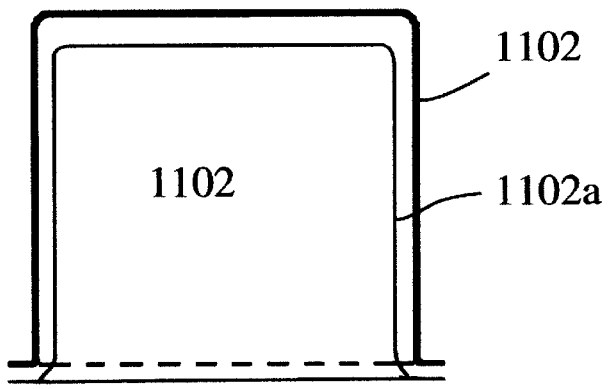
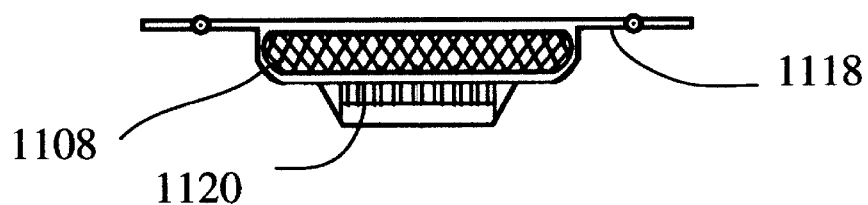
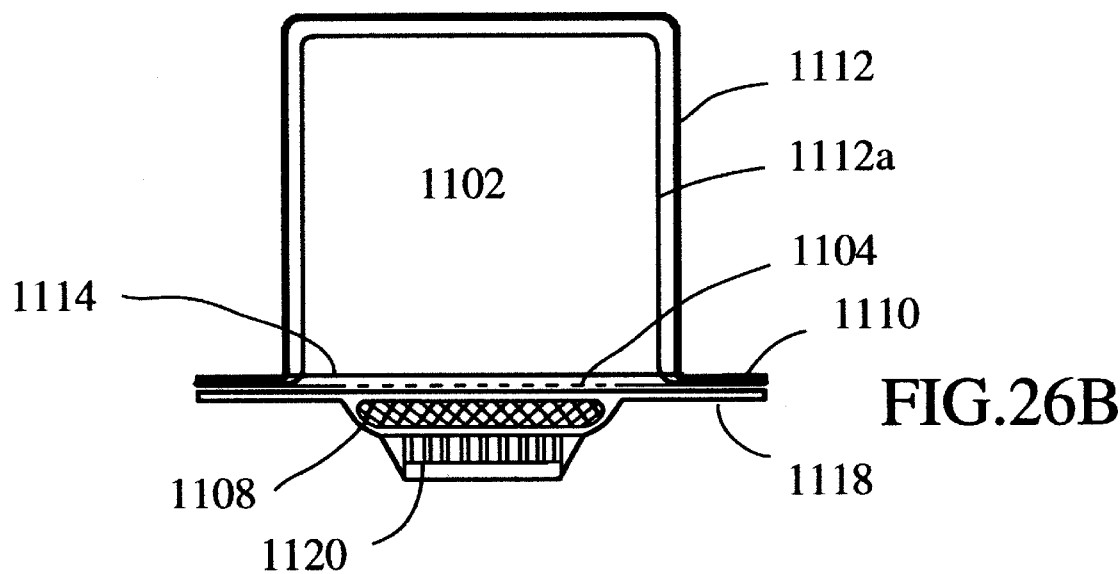
FIG.26A
FIG.26B

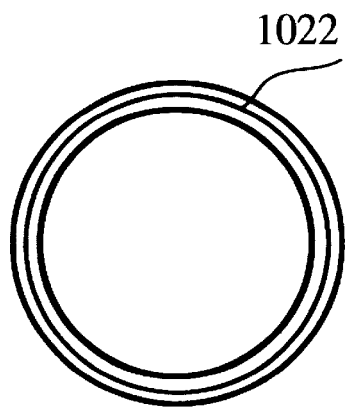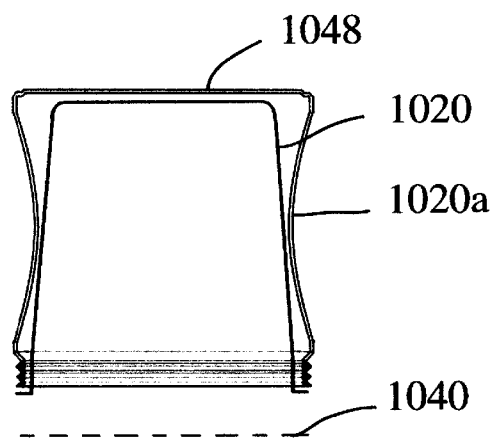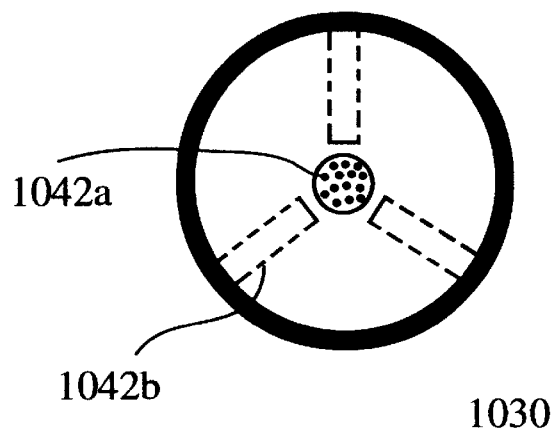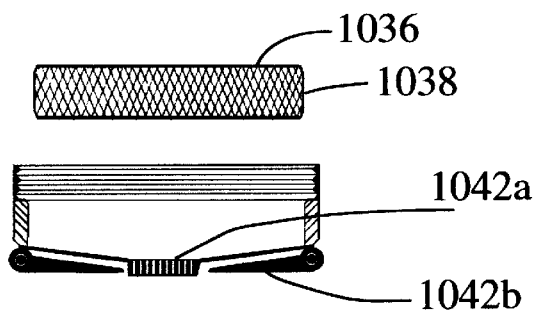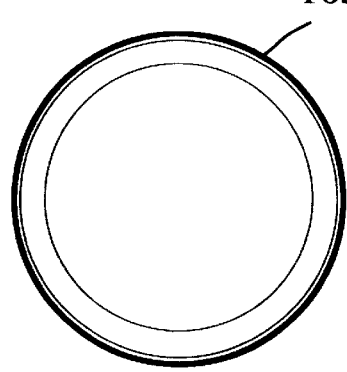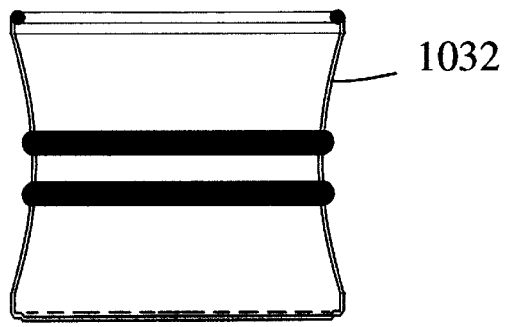
FIG.29A  FIG.29B

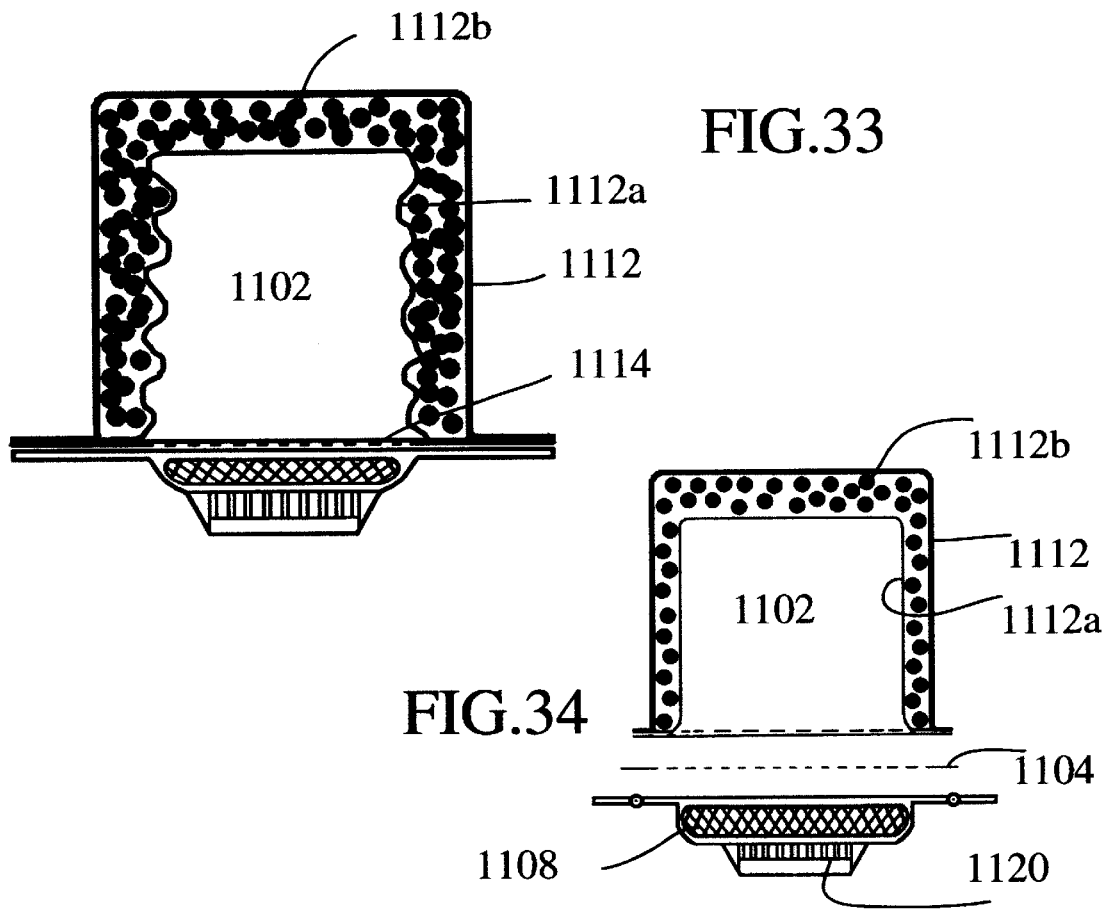
FIG.33
FIG.34
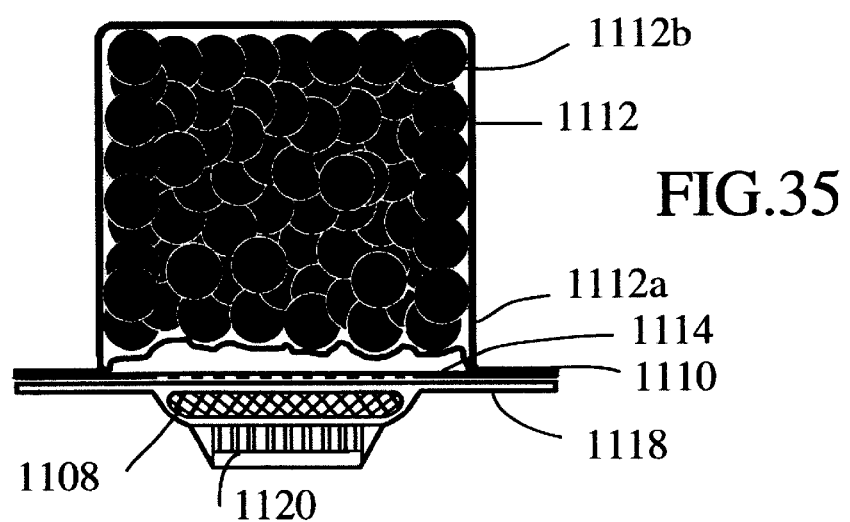
FIG.35

MAKING BEVERAGES AND FOOD IN A MICROWAVE OVEN

RELATED APPLICATIONS

This application relates to U.S. Pat. No. 6,229,128 "Making Beverages in a Microwave Oven" and issued on May 8, 2001; U.S. Provisional Patent Application No. 60/082,053, filed Apr. 16, 1998, entitled "Microwavable Device for Preparing Hot Beverages"; U.S. Provisional Patent Application No. 60/103,674, filed Oct. 9, 1998, entitled "Food and Beverage Making System"; U.S. Utility patent application Ser. No. 09/241,898, filed Feb. 1, 1999, entitled "Food and Beverage Making System"; U.S. Utility patent application Ser. No. 09/338,377, filed Jun. 23, 1999, entitled "Making Beverages in a Microwave Oven"; U.S. Provisional Patent Application No. 60/146,749, filed Aug. 2, 1999, entitled "Making Beverages in a Microwave Oven", and U.S. Provisional Patent Application No. 60/366,865, filed Mar. 21, 2002, entitled "Making Beverages and Food in a Microwave Oven. The contents of this patent and these applications are incorporated by reference herein.

BACKGROUND OF THE INVENTION

This invention relates to a device for use in a microwave oven for preparing hot beverages. In particularly, the invention is concerned with a device for preparing beverages such as cappuccino, café con latte, espresso, tea and other beverages. Some of these beverages may or may not include milk or dairy containing products. In other forms, the device can be used for injecting the essences of flavors into liquids in the form of flavored yogurts, flavored fruit juices, hot chocolate and similar products.

In the modern busy world it is desirable to provide devices that can be sold to a consumer for the quick preparation of hot beverages. Devices are known for making pots of coffee through a conventional electric element, but these are either slow or cumbersome for use by the consumer. Other devices are known for making espresso on a stovetop, and once again these are not of a consumer-friendly nature, such that they can be easily disposed of after use.

The device of the present invention can be used for providing hot drinks and/or drinks of different temperatures after their preparation in a microwave oven.

This invention also relates to a device system and method for use in and with a microwave oven for preparing and cooking digestible products such as beverages and foods. In particular, the invention is also concerned with a device for preparing beverages such as different coffee, coffee combinations, tea and tea combinations. Two or more components for the food or beverage can be combined to provide a desirable food or beverage. In other forms, the device can be used for adding essences of flavors into liquids, which can include milk products, fruit juices or the like. Moreover, the device can be used for brewing and fermenting purposes and for preparing and cooking solid food products and desserts.

It is desirable to provide a device as to a method which consumers can use for quick preparation of beverages and digestible foods which can include complete or other meals. A microwave oven is a useful device for facilitating quick preparation and/or cooking of food, and the invention uses the characteristics of a microwave oven to prepare desirable hot beverages, drinks, foods, desserts and other nutritional products.

SUMMARY

By this invention, there is provided a disposable device, preferably made of plastic, paper, press board, cardboard, or laminated components, and which preferably includes a cup for mixing multiple different ingredients under the action of microwaves in a conventional microwave oven. Such a device can be used to make espresso, cappuccino or other dairy containing products.

In a preferred form of the invention, the device includes multiple compartments, one of which is for containing water, and another of which is for containing a dairy product, preferably in a liquidized form. In the liquidized form, the dairy product could be a non-fat milk or other milk product which is suitably processed so as not to deteriorate in the environment. In a different form, the product including the milk products could contain dry powder or granules to start, and all the liquids are added later by a consumer.

A different compartment of the device can include a cup which is optionally fitted to form as part of the integral device when used in the microwave oven. In alternative forms, the cup can be a separate element which can be provided by the consumer to cooperate with the unit for making the hot beverage in the microwave oven.

By this invention, there is also provided a device, preferably disposable and preferably made of plastic, paper, pressboard, cardboard or laminated components, and which preferably includes a container in the nature of a cup or other plate element for use in serving or delivering the final product to a consumer for consumption. When the product prepared in the microwave oven is a beverage, one of the compartments can include a cup from which the beverage can be drunk. When the preparation is of a solid nature, one of the compartments can be in the form of a plate from which the consumable food product can be eaten. The materials forming the components of the device do not react to the microwaves in a substantially non-deleterious or harmful manner. Thus, the materials are compatible for use in a microwave oven.

In another preferred form of the invention, the consumable food or beverage includes at least two components which are separated prior to being subjected to microwave action. A suitable divider or filter can be used to keep these components separate prior to microwave action. The effect of microwaves on one of the components acts to break the seal separating the components and causes the components to mix to a desired degree, and thereby provides the desired beverage or food. In one form, one of the components is a liquid in the nature of water and, in another form, one of the components can be a liquefied dairy product. The other component can be in the form of an essence or concentrate such as granules or powder, which may, for instance, be coffee, tea, soups, powdered milk, or other flavoring such as vegetable or fruit concentrate. One or other of the component products in the system may need to be treated by suitable pasteurization or other processes to prevent premature deterioration in the environment.

In some other forms of the invention, one of the components is a solid vegetable, meat or fruit products, such as broccoli, potatoes, carrots, apples, pears or the like. The other component can be a suitable liquid in the form of water or a dairy product as a combination or a concentrate. The system provides for the cooking and/or preparation and/or blending of the two components to provide a suitable final end product for edible consumption.

In other forms of the invention, one of the components may be a yeast or fungus, and the combination effect under the process of microwaves can be used for producing alcoholic products in the nature of beer and/or suitable cheeses such as mozzarella cheese.

The invention includes several compartments making the device. The compartments are separated after subjection to microwaves, and one of the components being useful as a delivery means to the consumer. Prior to subjection to microwaves, the compartments can be suitably sealed with the ingredient components separated. The device can be supplied to the consumer in this manner.

In other forms of the invention, different separable elements can form one or more of the compartments. The elements can snap together or be screw connected.

In yet other forms of the invention, one or more spouts can be provided to a compartment for ejecting fluid processed under microwave power into a separate container. The spouts may be movable, preferably pivotally, between different operative and inoperative positions.

In another form of the invention there is provided one or more casings or covers for the compartment or compartments which contain components which are subject to treatment and processing under microwaves. Additionally, one or more of the compartments may be of different sizes to the other and the amount of material for treatment by the microwaves may differ in one compartment relative to another. Also expandable plastic-like components can be incorporated in one or more compartments, the components being expandable under the action of microwaves. This causes one compartment to expand while simultaneously it causes another compartment to shrink or decrease in size under the pressure exerted by the compartment of increased size.

The invention is further described with reference to the accompanying drawings.

BRIEF DESCRIPTION OF THE DRAWINGS

FIGS. 26A and B are cross-sectional side views of a different form of device without a second component which can be in the nature of a cup. The device includes two separate zones for containing a liquid and granular particles which may also be dissolvable. A non-shrinkable cover or casing is contained over one of the zones.

FIGS. 29A and 29B are respectively cross-sectional end views of different components and cross-sectional side views of different components of a device in accordance with the invention. The one compartment for containing fluid is covered by a relatively hard casing and within that compartment there is the flexible and collapsible component. The filter membrane between the two components is also relatively small and does not extend across the cross-section.

FIG. 33 is a cross-sectional view of an embodiment wherein there is a collapsible inner container, cells which are expandable under microwave action and a covering hard material.

FIG. 34 is a cross-sectional view with parts separated of the embodiment of FIG. 33 showing the cells prior to expansion and the internal container prior to shrinkage or size reduction.

FIG. 35 is a cross-sectional view of the configuration showing the cells expanded and the internal container contracted, shrunk or reduced in size when fluid has passed through the filtering medium.

DETAILED DESCRIPTION OF THE PREFERRED EMBODIMENTS

Figure 1:
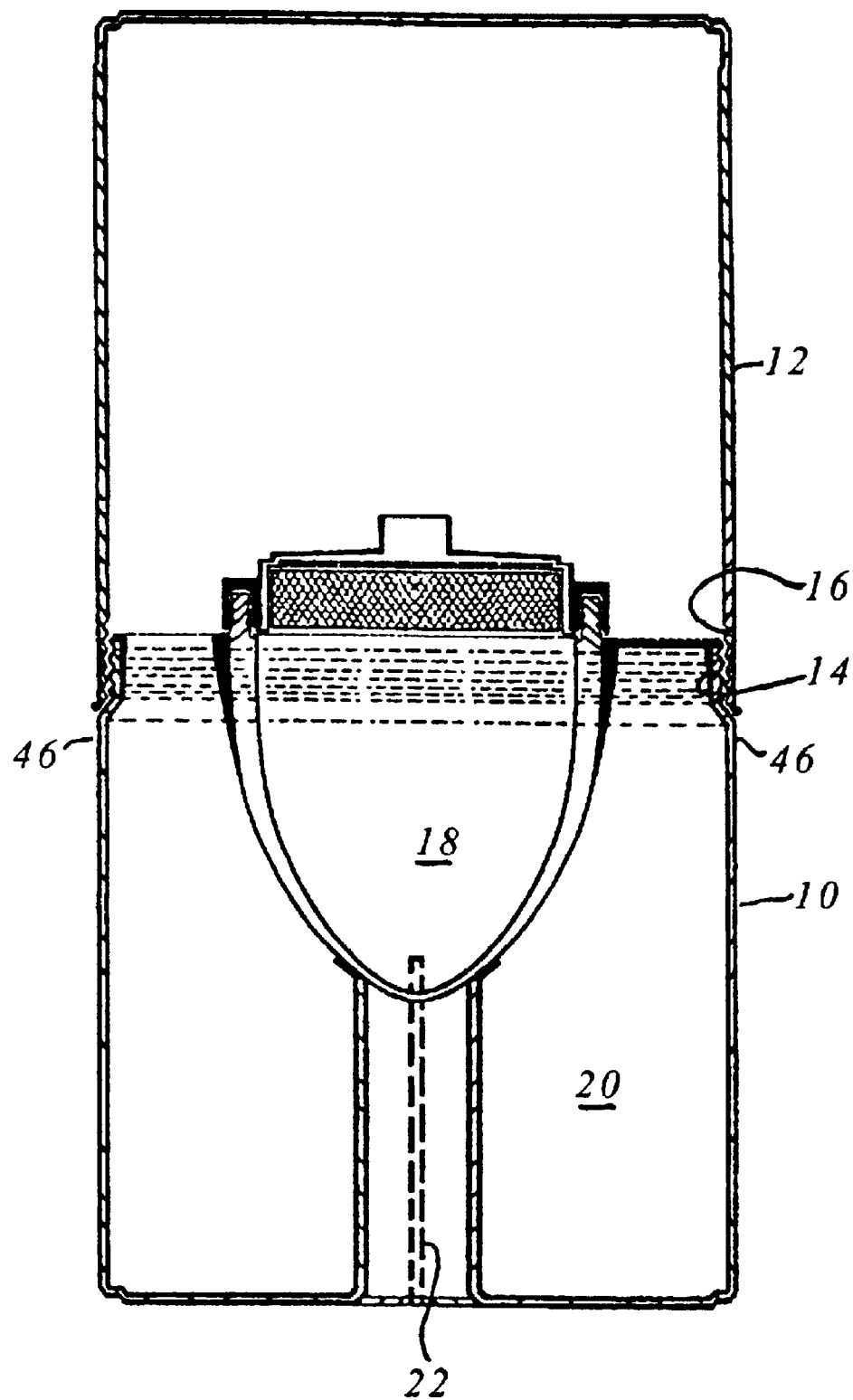
FIG. 1 is a cross-sectional view of a first device in accordance with the invention. The device has at least two compartments, one for water and one for dairy products. It is ideally suited for making cappuccino or café con latte.
Figure 2A:
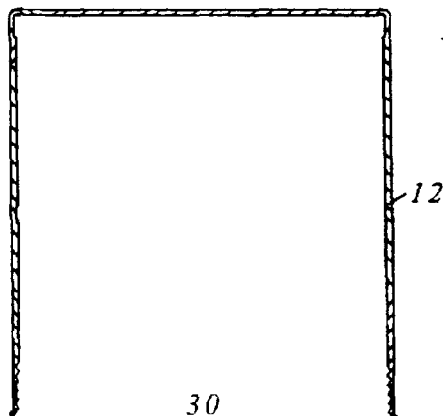
FIG. 2A is a cross-sectional side view of a cup.
Figure 2I:
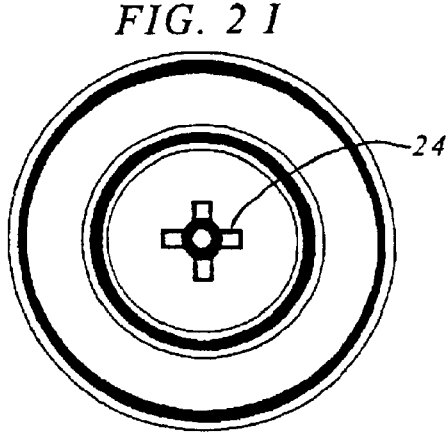
FIG. 2I is a cross-sectional view along line 21 of FIG. 2B.
Figure 2C:
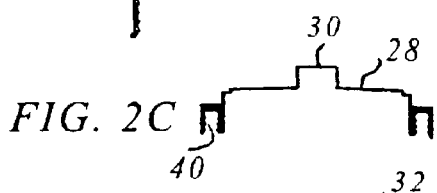
FIG. 2C is a cross-sectional side view of the sealing plate.
Figure 2D:
FIG. 2D is a cross-sectional side view of a first filter.
Figure 2E:
FIG. 2E is a cross-sectional side view of a coffee bag.
Figure 2F:
FIG. 2F is a cross-sectional side view of a filter for the coffee bag.
Figure 2G:
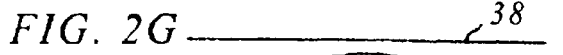
FIG. 2G is a cross-sectional side view of a filter over the milk container portion of the reservoir.
Figure 2H:
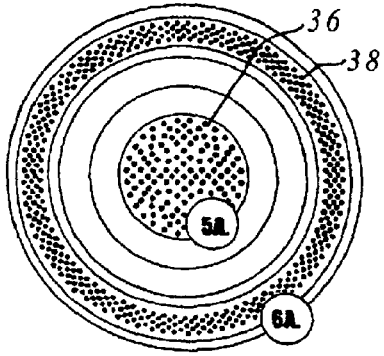
FIG. 2H is a top view of the combinations of FIGS. 2A–2G showing the ends of different components.
Figure 2B:
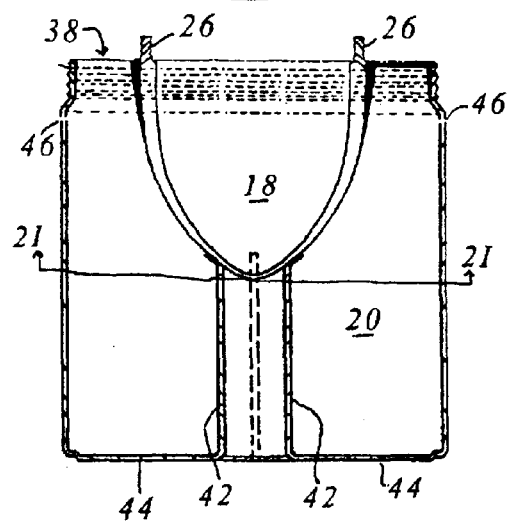
FIG. 2B is a cross-sectional side view of the bottom reservoir of the device.

In FIG. 1 there is shown a device for use in a microwave oven including a bottom reservoir 10 and a screw-on cup 12. The reservoir 10 and the cup 12 are for end-to-end engagement through a threaded interface 14 which is the top most portion of the bottom reservoir 10, and an internal female threaded section 16 which is at the free end of the cup. The reservoir portion 10 includes two reservoir sections, namely, a first reservoir 18 for holding water, and a second circumferential reservoir 20 for holding a milk product.

The second reservoir 20 is connected by means of a rod member 22 which is anchored to a cruciform shape 24 at the base of the first reservoir 18. The top of the reservoir 18 is sealed by a series of components which are screw connected to a threaded lip 26. The lip 26 includes internal threads and external threads.

The component closing the lip on the reservoir 18 includes a plate 28 with an outlet spout 30, which is in the invention of FIG. 1 centrally located. Below the plate 28 there is a circumferential filter element 32, which fits within the outlet area of plate 28. Below the filter element there is a coffee bag or basket 34.

Below the coffee bag or basket 34 is a second filter element 36. Below the second filter element 36 there is a further filter element 38 which is sufficiently large to engage circumferentially around the outside of the first reservoir 18, and the fluid filters from the second reservoir 20 before it enters the cup portion 12.

The components 28, 32, 34 and 36 are packed together. The plate 28 is screw threaded with internal threads 40 onto the threaded portions 26 at the top-most portion of the second reservoir 20. The circumferential outer filter 38 is likewise placed in position over the space between the second reservoir 20 and the first reservoir 18 as defined by the lip 14 of the first reservoir and the periphery 26 of the second reservoir.

When in use, the first reservoir 18 is filled with water, and the second reservoir 20 is filled with a dairy containing product such as liquidized milk. When sold to the consumer, these containers can be pre-filled with water and/or dairy product as indicated. Alternatively, the consumer can fill the compartments themselves. Ideally, the device is made of multiple plastic, paper, press board, cardboard or laminated components and is fully disposable. In this fashion, compartments 18 and 20 can be pre-filled with liquid before sold to the consumer.

When the device is placed in a microwave oven, the water in the first reservoir 18 will boil up and be passed under pressure through the coffee in the basket 34. After passing through the various filters, the water will be ejected from the spout 30 into the cup 12. Likewise, the milk containing product in reservoir 20 will be ejected through the screen 38 and be ejected into the cup 12. In this manner, the cappuccino or café con latte product is ejected into the cup 12 to form an instant cappuccino or café con latte product. For creating cappuccino the apertures 38 are sufficiently small so that the milk will spray into the cup to create a foam, as required for cappuccino.

The cup 12 can then be unscrewed at 14 from the reservoir base, and the consumer can then have a pre-prepared hot coffee beverage in a matter of seconds.

In other forms of the invention, this configuration can be used for providing, for instance, hot chocolate. In the basket 34 there can be hot chocolate essence, and milk and water can be provided in reservoirs 18 and 20 as required.

In other forms, different essences or products can be provided in basket 34 combining fluids in reservoirs 18 and 20 to provide a different desirable product.

From a construction perspective, the reservoir 18 is formed in a manner to be fixed to the upstanding legs 42, which extend from the case 44 of the reservoir 20.

In some other forms of the invention, the cup 12 can be an optional item. In other words, a consumer can provide his own cup and the base reservoir 20 can be provided. When used in the microwave oven, the base reservoir 20 could be placed in relationship with the cup 12. Ideally, it would be placed in a manner that the cup 12 is upside down as indicated in FIG. 1. Where the user's own cup is used, the base reservoir 20 may be reversed from that shown in FIG. 1, and can be placed to point downwardly onto the consumer's cup. This may be necessary because the consumer's cup is not going to fit in tightly with the product as indicated in the embodiments of FIGS. 1 and 2. Vent holes 46 are provided at the top perimeter portion of the reservoir 20 for venting air where required. The vent holes are optional.

Figure 3:
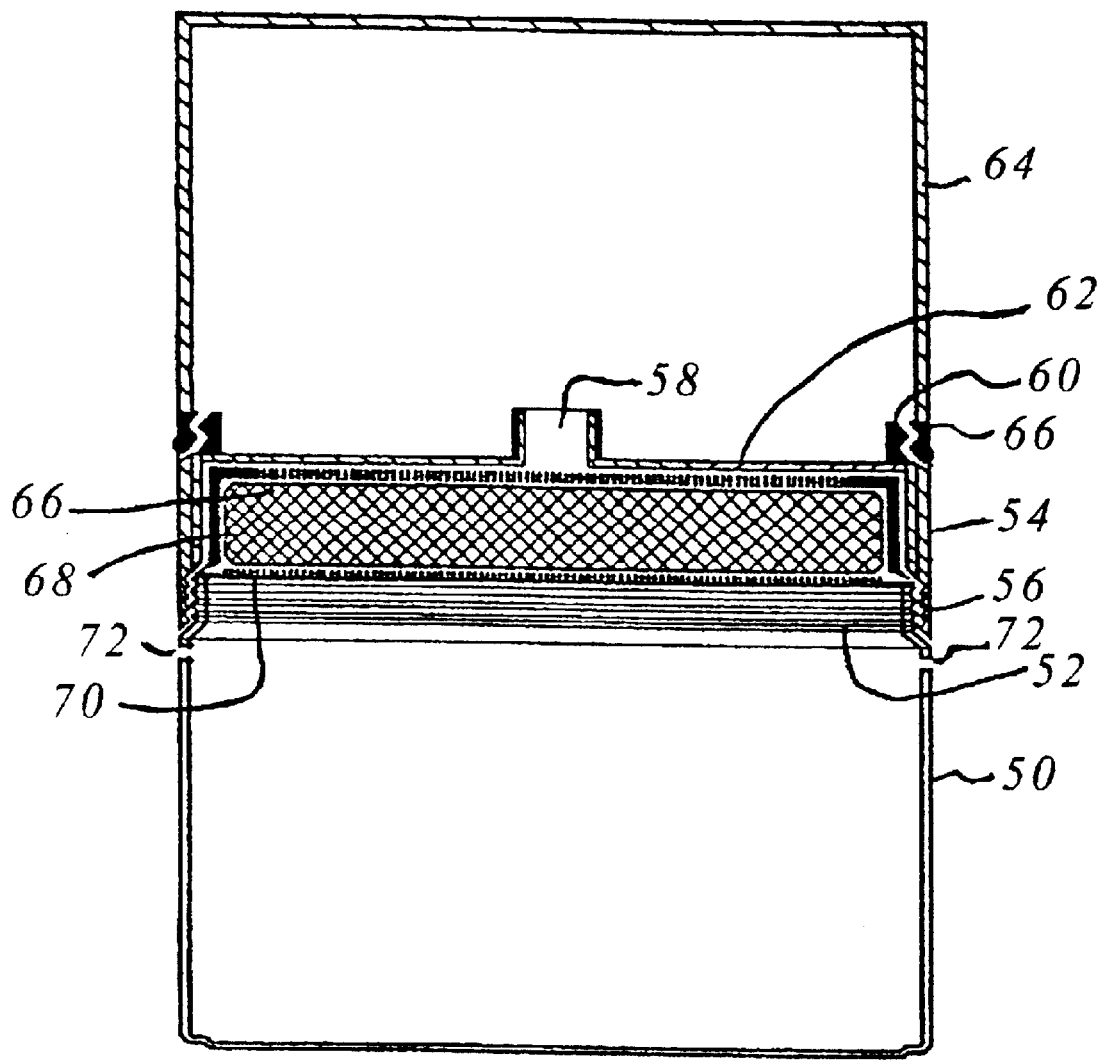
FIG. 3 is a cross-sectional side view of a second device for use with only a single compartment to contain water, and ideal for making espresso.

FIG. 3 shows a system for producing a hot beverage containing a single ingredient. There is a lower reservoir 50 for containing water. This reservoir includes a male threaded section 52 at its topmost portion. This male threaded section 52 engages a closure circumferential plate 54 which includes internal female threads 56. The plate 54 includes a plate 62 and an exit spout 58 centrally located.

There is also a male threaded projection 60 which extends from the plate 62 of the element 54. A cup 64 engages the threaded portion 60, and there is a female threaded section 68 for engaging the threads 60.

Below the sealing plate 62 is a filter portion or plate 66, and below that is a pouch or the like for containing coffee or some other beverage, such as chocolate, tea or similar essence. A filter plate 70 is located below the pouch 68. When used, the reservoir 50 contains water and the coffee pouch 68 is in place.

The device is placed in a microwave oven and, as the water boils, it forces itself through the filters, the coffee pouch and out the exit spout 58 into the cup portion 64. Thereafter, the cup portion 64 can be unthreaded from the plate 54 by disengaging threads 60 and 66. The cup 64 can then be used to drink the beverage. The entire device is disposable.

By having this arrangement, espresso can be made in a microwave oven in a matter of second rather than minutes. In other words, the power of the microwave boils the water more quickly forcing the water through the coffee pouch 68 to thereby form the espresso.

The components making the device are of a plastic which is sufficiently strong to withstand the pressures of the boiling water forcing itself through the pouch. Since the unit is disposable and is not intended for reuse, the nature of the plastic can be of a kind whereby it does not need to withstand excessive pressures. In certain circumstances it may be necessary to permit the venting of air from one or other of the containers 50 or 64 and, for this purpose, vents 72 are optionally provided and are shown in the bottom reservoir 50. These are, in a sense, radially disposed towards the top end of the reservoir 50.

Figure 4:
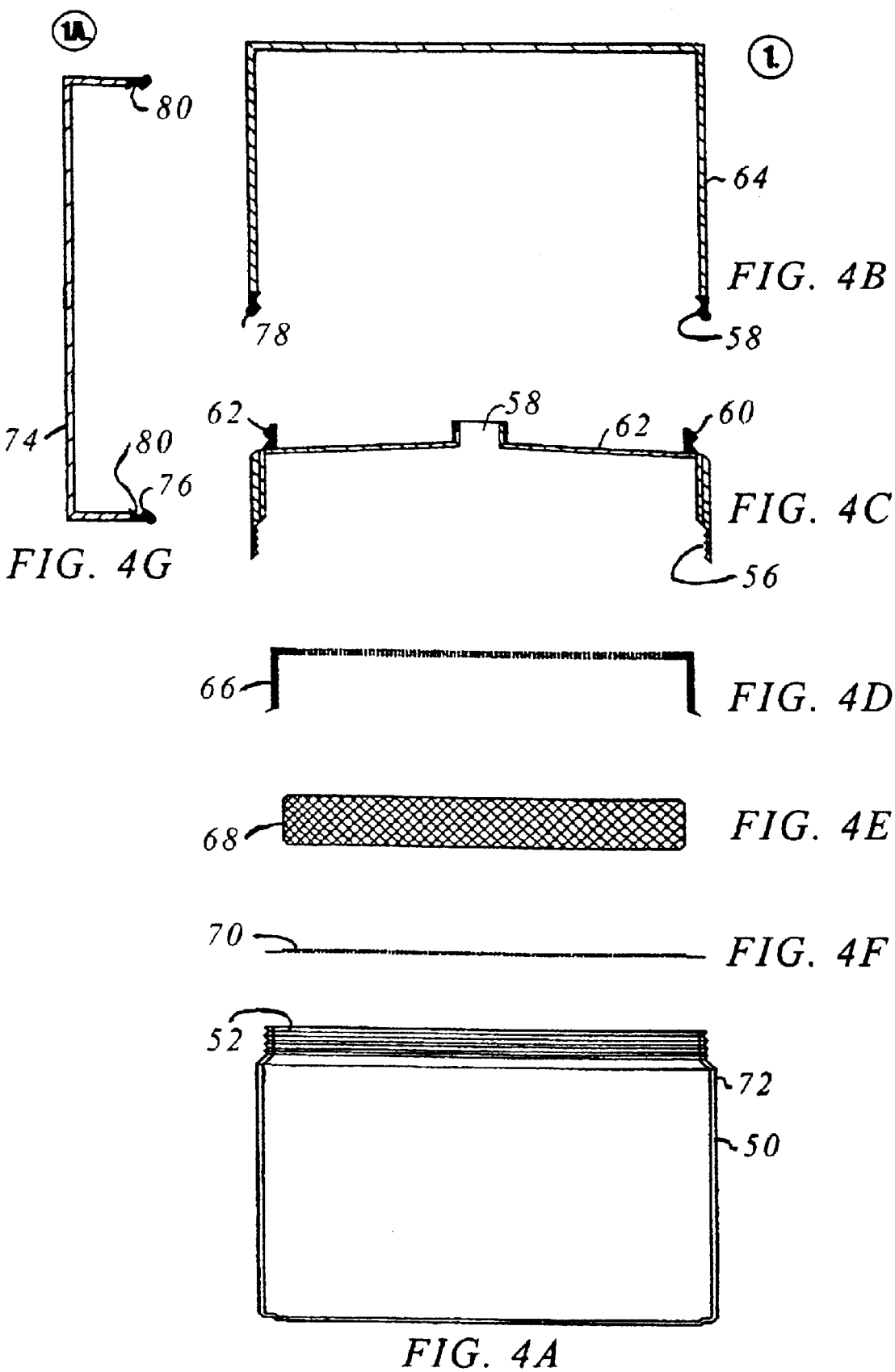
FIG. 4A is a cross-sectional side view of the reservoir for containing water.
FIG. 4B is a cross-sectional side view of a cup which also forms the top of the device.
FIG. 4C is a cross-sectional side view of the plate sealing the bottom reservoir.
FIG. 4D is a cross-sectional side view of a filter on one side of the coffee container.
FIG. 4E is a cross-sectional side view of the coffee container.
FIG. 4F is a cross-sectional side view of a filter on the other side of the coffee container.
FIG. 4G is a cross-sectional side view of a lid which could be located either over the cup of FIG. 4B or the plate of FIG. 4C.

In FIG. 4G there is also shown a lid element 74 which has internal threads 76. These threads can engage the threaded portion 60 in the sealing plate 62 as may be required. Alternatively, it can engage the threads 58 on the top portion of the cup. This engagement with the threads 58 may just be an interengaging bead formation 78 at the top of the cup which interengages in the slot portion 80 in the lid.

Figure 5:
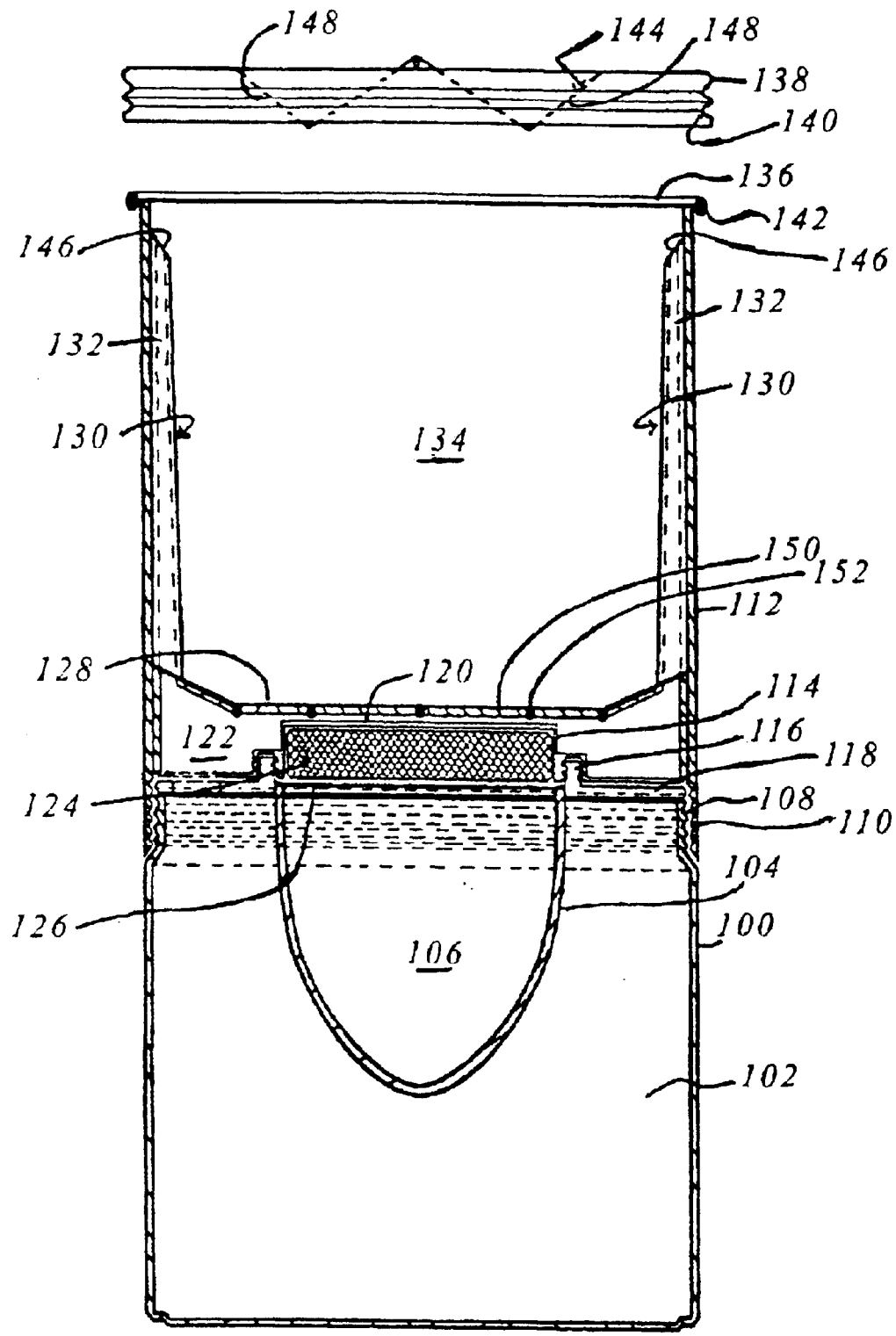
FIG. 5 is a cross-sectional side view of a device for making products where two ingredients need to be blended together, and wherein the top portion forms a cup.

As illustrated in FIG. 5, there is shown an arrangement where there is bottom reservoir 100 for containing a dairy product 102. There is an internal reservoir 104 for containing a water 106. The topmost portion of the reservoir 100 includes a male threaded portion 108 which engages with the female threads 110 of a base of a cup portion 112. By engaging these threaded sections, there is also trapped between the two, the sealing plate 114, which threadingly engages with an upstanding stud 116, which is formed from the top plate 118 across the reservoir 100. The sealing plate 114 includes a face plate 120 with small apertures to permit the egress of fluid into the cavity 122. Below the plate 120 there is a pouch 124 for containing coffee or the like, and below the pouch 124 there is a sealing plate 126. The cup 112 includes a base 128 and two upstanding pipes 130 which are located along the edge perimeter of the cup 112. The pipes 130 include an internal bore 132 which bore of each pipe is connected with the cavity 122. Inside the pipes 130 is the chamber 134 for containing the prepared beverage. The top 136 of the cup 112 includes a lid 138 which has an internal thread 140 for engaging with the element 142 on top of the cup 112. The cup 112 also includes a jagged top face 144. The purpose of the jagged top face 144 is that when fluid under pressure exits from the outlets 146 of the pipes 130, the fluids under pressure engages the faces 148 and deflects fluid downwardly into the reservoir 134 of the cup. The base 150 of the cup includes reinforcing beads 152, which may be required for this construction.

The system of this invention is of the nature that when the device is put in the microwave oven, the water and dairy product boil and move upwardly from the reservoirs 106 and 102 respectively into the cup 112. Water from the reservoir 106 passes through the filters 126 and 120 and also the essence bag in between and thereby forces the fluid into the cavity 122. Dairy product or milk in the cavity 102 passes through the plate 118 which has appropriate holes, and into the cavity 122. As the pressure increases in cavity 122, the fluid rises up the pipes 130 through the ports 132. The heated fluid then exits from outlets 146 into the cavity 134 of the cup.

Figure 6:
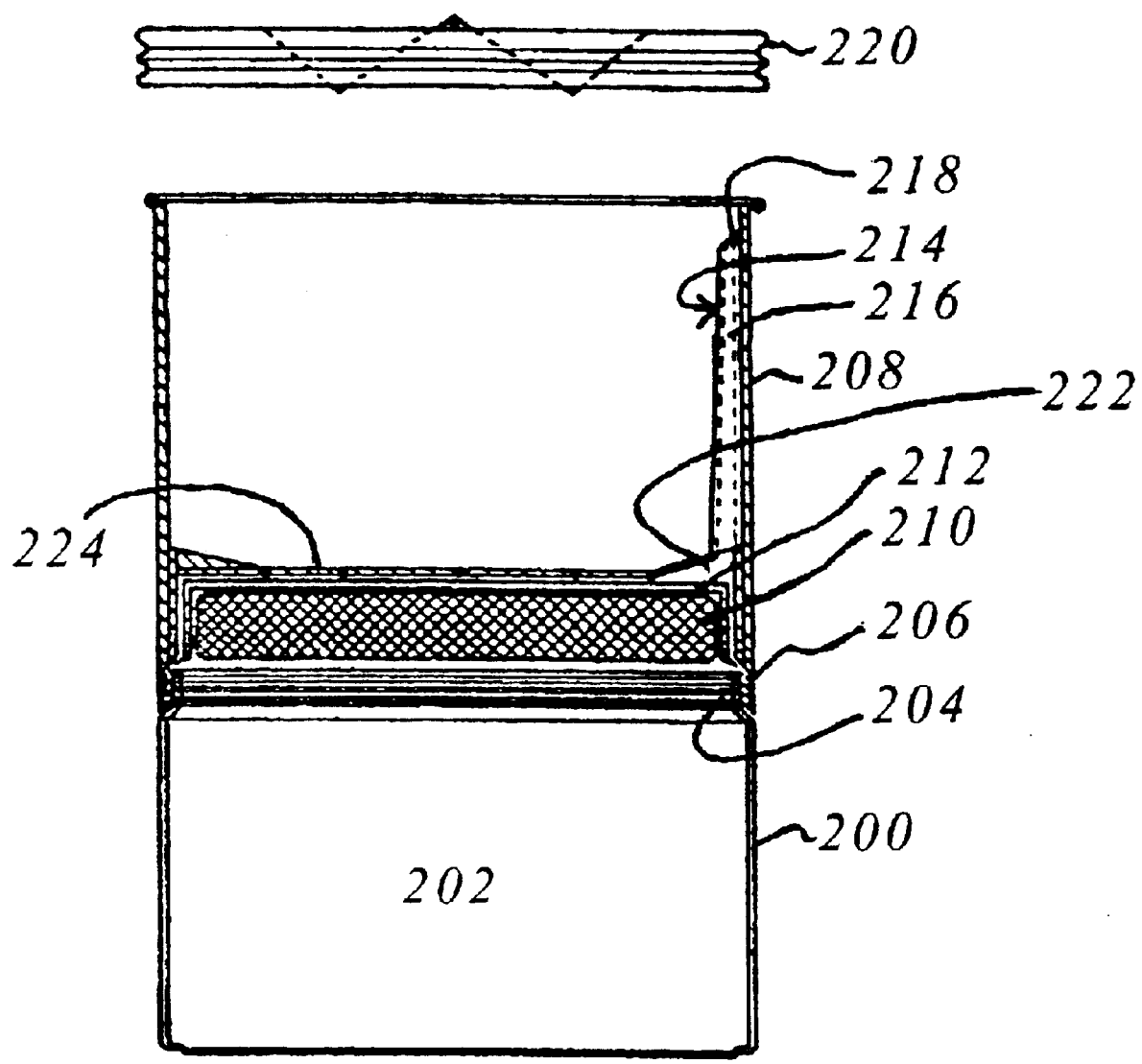
FIG. 6 is a cross-sectional view of a device for making a single ingredient component wherein the top section forms a cup.

As illustrated in FIG. 6, the configuration is similar to that in FIG. 5. There is however, only a single cavity or container 200 which forms the bottom or base reservoir for containing water 202. There is a male threaded top 204 which engages the female threaded base 206 of the cup 208. Above the top threaded portion 204, there is a coffee pouch 210 and a filter element 212.

The cup 208 includes a single pipe 214 with a bore 216 having an outlet 218 towards the top of the cup 208.

On top of the cup 208 there is a lid 220 which threadingly engages with the top of the cup 208 as indicated. The lid 220 includes an undulated top for the similar purposes as described with regard to FIG. 5. There is also a cavity 222 below the base 224 of the cup 208 and above the filter plate 212. When the device is placed in a microwave oven and the water boils in 202, it is forced through the appropriate coffee bag and filters into the cavity 222. From there, the water goes up the pipe 214 through the bore 216 and into the cup 208. The cup 208 can then be separated from the base portion and used to drink the prepared beverage. The lid 220 can be used optionally as required.

Figure 7:
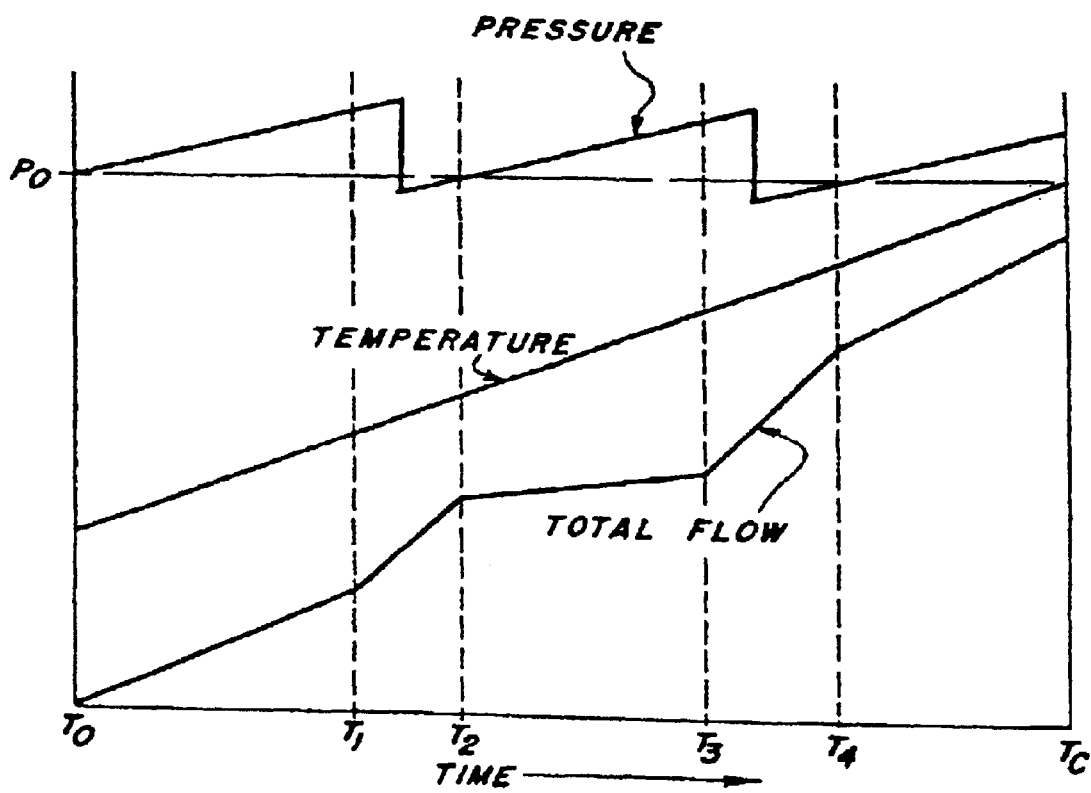
FIG. 7 is a graphical representation showing the changes of pressure within a sealed reservoir relative to water temperature and total flow in the reservoir as used in the device for use in the microwave oven.

FIG. 7 is a schematic representation of the relationship of the pressure within the chamber, the temperature of the water retained therein and the total flow of the water from the chamber. When water is filled within the reservoir, the placement of the lid on top creates an initial pressurization of the chamber. This initial pressurization serves to prime the transfer tube causing the water to flow through the inlet leg. The water expelled from the outlet, upon this initial pressurization, is discharged into the coffee basket, wetting the grounds. It is contemplated that the pressure within the chamber will be slightly greater than ambient pressure due to the balancing of the water level.

The initial pressure P0 within the chamber is defined on the graph of FIG. 7. The starting time T0 for the brewing cycle is the initiation of the microwave energy from the microwave oven. The microwave energy immediately begins to increase the water temperature within the chamber. This increase in temperature of the water over the brewing cycle is substantially linear. The increase in temperature causes an increase in the pressure within the chamber. Because of the priming, the pumping system is initiated substantially immediately upon application of the microwave energy.

The flow of water caused by the increase in pressure during this initial time period T is substantially constant. At a certain point in time there is a substantial increase in the flow rate of the water from the reservoir. This increased flow causes a drop in pressure within the chamber due to the substantial reduction in water volume therein, without a corresponding increase in pressure due to a rise in water temperature. The pressure is contemplated to become substantially negative, or below ambient, and below the initial pressure P0. This negative pressure causes a restriction on the flow of the hydraulic head advantage. This restricted flow is seen at the period between time T2 and T3.

It is contemplated that the brewing cycle will further include a second pressure increase with the hydraulic head advantage again taking precedent over the pumping system. A sudden increase in flow occurs at about time T3. During the period between T3 and T4 there is a second substantial reduction in the pressure within the chamber. However, the higher water temperature likely restores the vapor pressure at a faster rate, causing a faster flow between the period T4 through Tc than during the period T2 through T3. Upon completion of the brewing cycle, substantially all of the water flows through the transfer tube into the coffee basket.

FIG. 7 is representative of the observed operation of an apparatus made in accordance with the present invention. The number of pressure cycles during any brew may vary according to the water temperature, the quantity of water within the chamber, the diameter of the tube, the wattage of the microwave oven and other factors. The slope and positioning of the curves illustrated are not limiting. Variations in structure of the reservoir and transfer tube will also change the results obtained from the application of microwave energy.

As indicated, the present invention can be used for different beverages including milk containing beverages such as milkshakes. The beverages can be prepared hot and then later drunk cooled. The substances are disposable and for use in a microwave oven. They can be prepared and sold with or without the ingredients, which can be the essence such as the coffee in a bag, the water and/or the milk. Ideally, in a pre-prepared package form it can have all the products in the device. Therefore, the consumer needs only to place the unit in the microwave oven for a few seconds to heat the water and then have a beverage which would otherwise take a much longer time to prepare. The disposable nature of the components provides for a useful device.

Other forms of the invention exist, each differing from the other in matters of detail only. For instance, in other configurations of the device, more than one outlet can be provided for the water, and the water can be located in a different position relative to the base container and the cup. In other words, it may not be centrally located but rather on the side. Likewise, the milk could be forced to exit from the base container into the cup from a different location and in one or more locations as necessary and desirable to achieve the right mix of components. By being able to spray fluid into the cup, there is created a foam in the cup. This can be useful for many different kinds of beverages.

Although it is the intent that the unit be of a disposable nature and for single use only. It may be possible to develop the unit for multiple use in microwave oven. In such a form, different bags of essences or components which water or flavoring must be forced can be provided separately. Also, in other cases, the drinking cup can be optional. As such, the consumer may be able to use their own drinking cups in combination with the base reservoir. Although the configuration is shown whereby water is forced upwardly through the device, there could be configurations wherein use of the water is located in the top reservoir and drips into the cup below. In different situations, it may be necessary to provide a temporary seal between the water and dairy containing fluid and the coffee so that premature mixing inadvertently or otherwise does not take place before the unit is placed in the microwave oven. This seal may be manually removable or may break under the pressure of steam generating in the one reservoir and forcing itself into the second reservoir through a coffee bag or the like.

Different outside profiles of containers and reservoirs can be used. In some cases, an existing kind of paper cup can be used in combination with the pressure container. Also, different kinds of connections can be used for the components: for instance, instead of the threaded interengagement, this can a bayonet fitting.

Figures 8A, 8B:
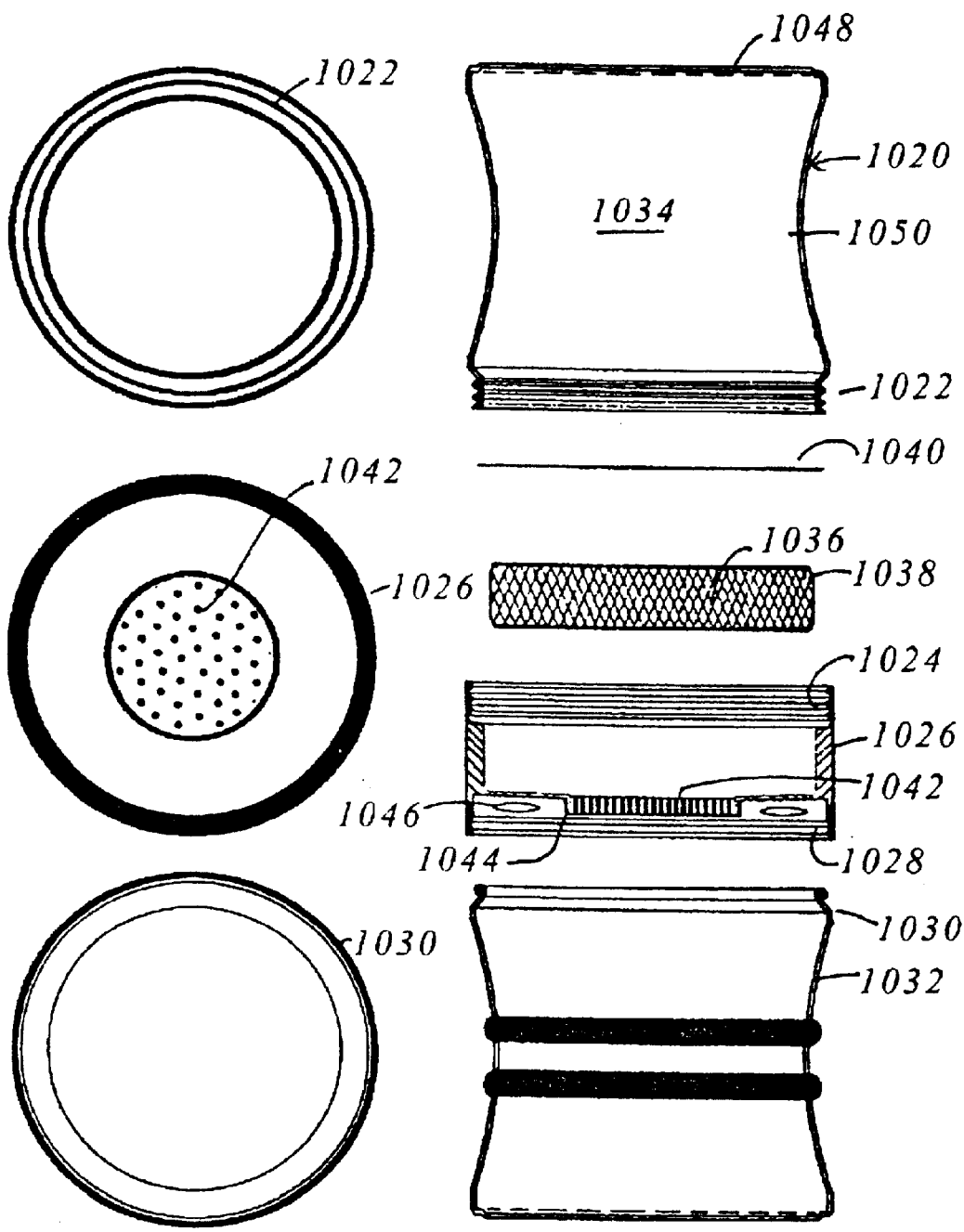
FIGS. 8A and 8B are, respectively, cross-sectional end views of different components and cross-sectional side views of different components of a first device in accordance with the invention. The device has at least two or more compartments, one for water and the other for granular products. It is ideally suited for making espresso in a container component of the device.
Figure 9:
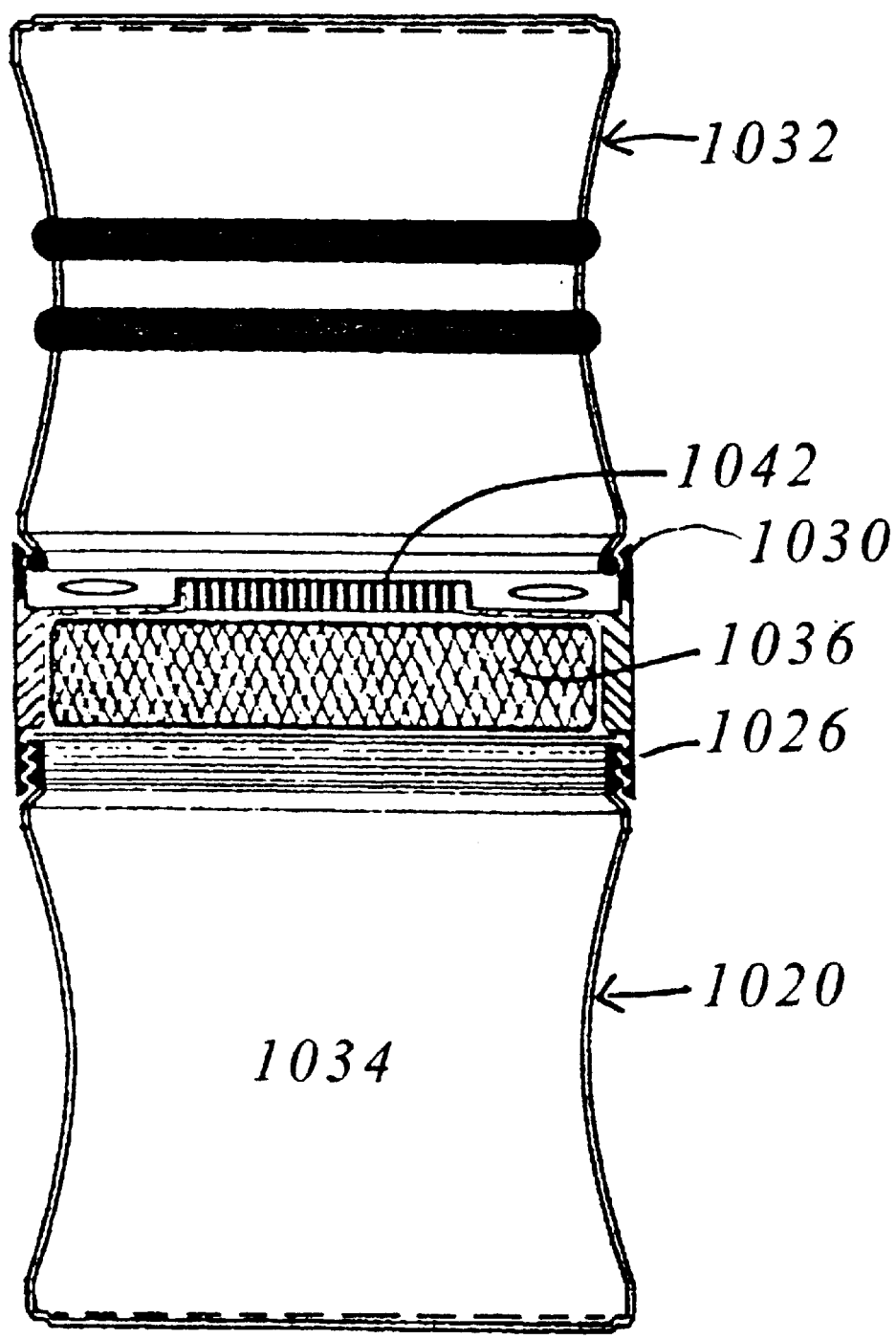
FIG. 9 is a cross-sectional view of the device of FIGS. 8A and 8B in their assembled state.

FIGS. 8A and 8B and 9 show a system for producing a hot beverage containing a single ingredient. There is an upper reservoir 1020 for containing water. This reservoir includes a male threaded section 1022 at its lowermost portion. This male threaded section is for engaging a female threaded section 1024 on an intermediate element 1026 which is provided for containing one of the components. The intermediate section 1026 can have a female coupling element 1028 for receiving a beaded section or threaded interface 1030 of a cup portion 1032 which is conventionally the lowermost portion of the device. The interface 1030 is a lip which can be snap connected with its mating component or disconnected from its mating component under pressure. It can be connected during manufacture under pressure snapped on. When used, it is snapped off. Alternatively, it can be screwed or twisted on or off.

The component 1020 only contains liquid or water 1034, and the intermediate section 1026 contains a granular material 1036 which may be in a container or bag 1038. Above the intermediate section 1026, there is contained a filter or sealing element 1040 which acts to effectively seal the water 1034 from engagement with the granular material 1036 prematurely.

Intermediate section 1026 includes a series of apertures 1042 in a filter element zone 1044 which is circumferentially centrally disposed in the intermediate section 1026. Around the perimeter of the filter element 1044, there are one or more valves 1046 which can be circumferentially arranged around the element 1044, and which connect as escape valves as necessary. One or more additional escape valves 1048 can be provided in the wall 1050 of the top of the container 1020.

The extra escape valve 1048 may be necessary if the water 1034 in the container 1020 is subject to overboiling. The escape valve 1048 or one or more of the valves 1046 can be used to prevent excess pressure from building up, and water or steam can thereby be permitted to escape from the container 1020 as necessary.

Prior to subjection to microwaves, the topmost portion 1020 can be screw connected with the intermediate section 1026 and cup or lowermost portion 1032 can be connected with the intermediate section 1026. Alternatively, the connection of the top 1020 can be hot sealed or bonded to the intermediate portion 1026. The filter 1040 is in place with the granules 1036 in the bag in the intermediate section 1026. The water 1034 is separated from the bag 1038 by the separation element 1040. When subjected to microwaves, the boiling effect on the liquid 1034 causes an expansion of the fluid which acts to break the seal 1040 and cause water to penetrate and pass through the granules 1036 under pressure. The water containing the essence of the granules, which can be in the nature of coffee, then pass through the holes 1042 in the filter element 1044 into the cup 1032.

After a sufficient time, when all or a sufficient amount of the water has passed through the granules, the microwave action is stopped and the device is removed from the microwave oven. The cup 1032 can then be separated and a suitable hot beverage is contained in the cup 1032. The uppermost portions 1020 can then be discarded. The cup 1032 can also be discarded.

In some cases, the cup 1032 can be reusable and the uppermost portion 1020 and intermediate section 1026 of a separate new device can be used with a reusable cup 1032.

As illustrated in FIG. 9, the device of FIGS. 8A and 8B are shown in the position wherein the bottom portion 1032 is located above the portion 1020. In certain situations, this reverse configuration may be more suitable, either prior to sale or use of the device or, in fact, as the preferred configuration in which the device is placed in the microwave oven. In other words, the device can be used in a microwave oven in either of the orientations of FIGS. 8A and 8B or FIG. 9. Whereas in FIGS. 8A and 8B the force of the liquid would be downward into the cup 1032. In FIG. 9 the force of the liquid in container 1020 would be upward into the cup 1032. Prior to use or separation of the cup 1032, the device would be turned upside down since it would be the cup 1032, which contains the heated beverage for use or consumption.

Figures 10A, 10B:
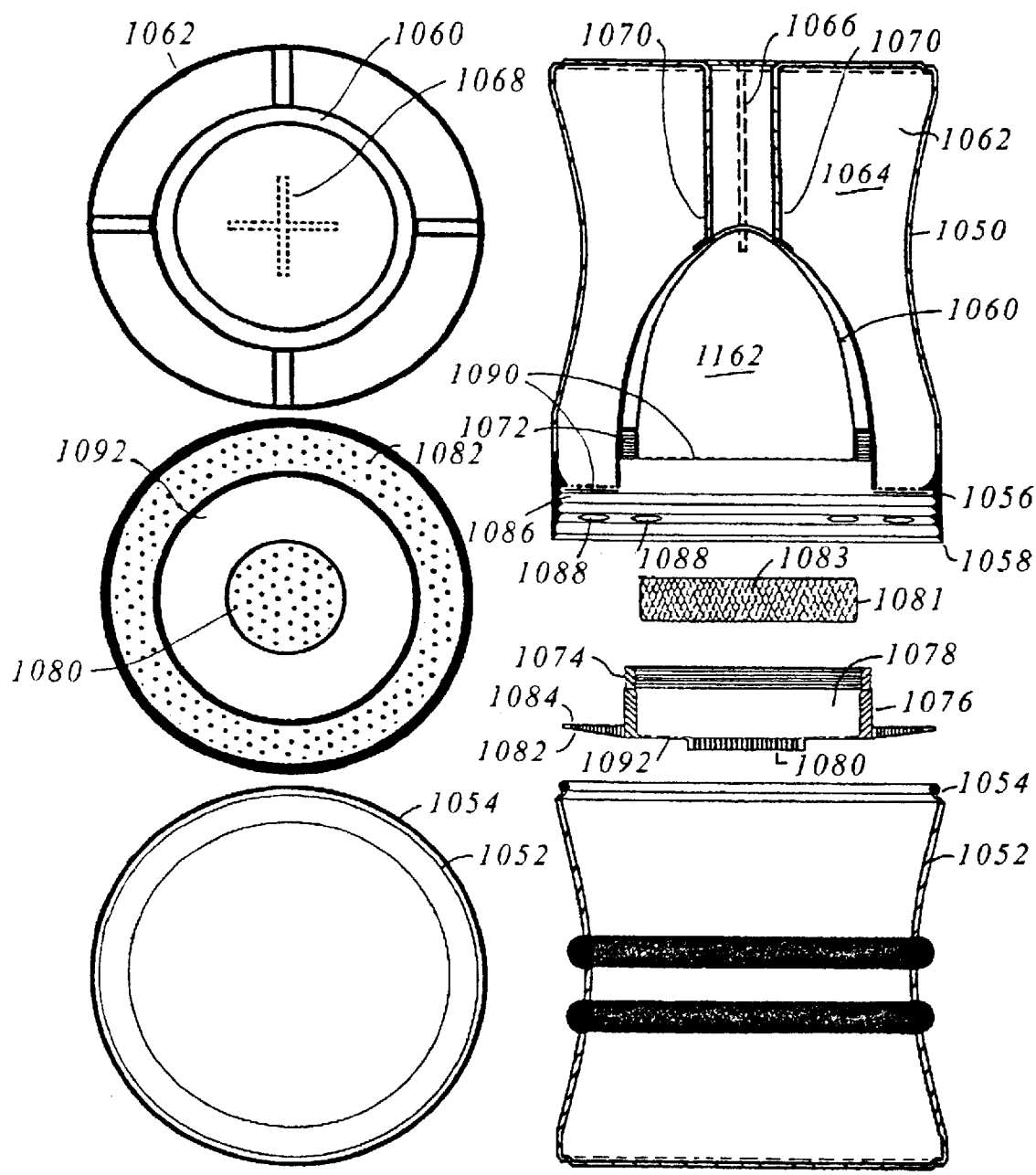
FIGS. 10A and 10B are, respectively, cross-sectional end views of different components and cross-sectional side views of different components of a second device in accordance with the invention. The device has at least two components, one for water and one for dairy products. Additionally, there is a compartment for granular materials such as coffee. It is ideally suited for making cappuccino or café con latte.

In FIGS. 10A and 10B there is shown a device for use in a microwave oven including a top reservoir 1050 and a snap-on or screw-on cup 1052, which is normally located on the bottom. The reservoir 1050 and cup 1052 are for end-to-end engagement through the interface 1054 which may be in the nature of a sealing ring for engagement in a circumferential semi-circular slot or groove 1056 around the free end 1058 of the container 1050. The reservoir portion 1050 contains at least two reservoir sections: a first reservoir section 1060 for holding water 1162 and a second reservoir section 1062 for holding a milk product 1064.

The first reservoir section 1060 is connected by means of a rod member 1066, which is anchored to a cruciform shape 1068 at the base of the reservoir 1060 to wall portions 1070, which are in the form of internal-type walls to the reservoir 1060.

The reservoir 1060 includes an internal female threaded section 1072 for engagement with male thread 1074 of an intermediate section 1076. The intermediate section 1076 includes a cup-type portion 1078 for receiving a bag 1081 of granulated material such as coffee 1083. In the base of the cup portion 1078 there is a filter zone 1080, and there is an additional peripheral zone 1082 on circumferential flange 1084 which extends from the cup portion 1076. Filter zones 1091 and 1083 are a perforated wall, floor, mesh or selectively a double layer mesh. The double layer mesh can assist in making foam milk, for instance, for cappuccino. The double mesh can be two different gaskets, one on top of each other with a space between them. Alternatively, it can a component to embrace filter 1092 over the top and/or bottom of 1082.

Built into the threaded or slotted portion 1086 at the free end of the reservoir portion 1050 are one or more elliptically-shaped valve elements 1088 which connect as an escape for excess fluid when the reservoir 1050 with its fluid is put under microwave action, and pressure builds up due to the energy of microwaves on the fluid in one or more of the reservoir components 1060 or 1062.

The cup 1052, as indicated, engages the groove 1058 so that an integral unit is provided for use in a microwave oven. When it is subjected to microwaves, pressure builds up in the first component 1060 and in the components 1062. Each of the respective fluids expands or boils or steams at its appropriate level when the pressures are appropriate. The fluid 1162 in compartment 1060 passes through the granulated material 1083 in the sack 1080 and enters the cup 1052. The dairy product 1064 passes separately through the filter 1082 around the cup portion 1078 and suitably froths as it enters the cup portion 1052. In this manner, a beverage formed by water passing through the granules 1082 and entering the cup 1052 can mix and blend with frothed milk or dairy product in the cup 1052, and suitable co-mixture is provided.

Prior to the mixing action in the microwave oven, filter element 1090 at the top of component 1060 retain the liquid 1162 separated from the granules 1085 thereby preventing premature mixing. Between the filter 1080 and 1082 there is a relatively solid circumferential ring 1092, which is provided so that the filter area 1080 and filter area 1082 are of the relatively required areas to provide effective mixing. The area 1092 may be increased or decreased relative to the size of the filter areas 1080 or 1082 according to the beverage being made and the requisite degree of mixing which is required.

The compartment 1060 and 1062 can be varied in size so that the relative amounts of fluid 1162 and 1064 can be changed according to the beverage to be made in the system. In other cases, the device, prior to use in the microwave oven, may be turned in an opposite direction such that the cup 1052 is above the double container 1050. In other variations of the invention, more than two compartments 1060 and 1062 can be provided in the portion 1050. Thus, there could be three or four compartments whereby different or multiple components can be mixed to make the ultimate beverage. Each compartment can be sized according to the amount of each component required to be mixed into the ultimate beverage in the cup 1052.

Figure 12:
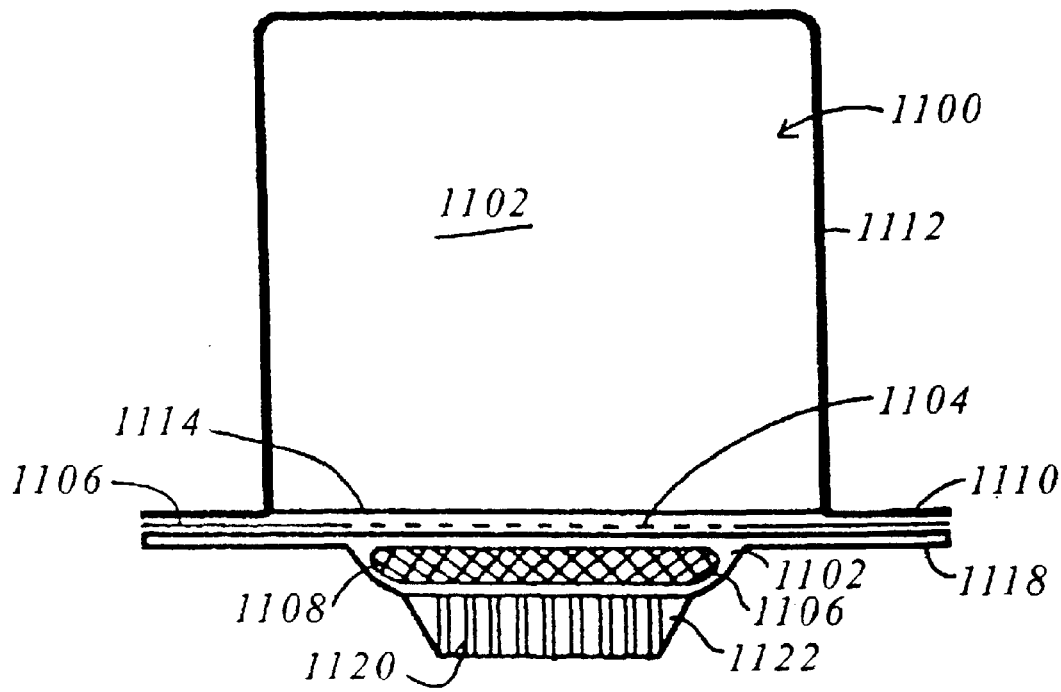
FIG. 12 is a cross-sectional side view of a different form of the device without a second component which can be in the nature of a cup. The device includes two separated zones for containing a liquid and granular particles, which may be also be dissolvable.

In FIG. 12 there is illustrated a side view of a device having a single compartment 1100 in which there is contained water or light liquid component. This may be a dairy product. The second compartment 1102 is formed in adjacency with the first compartment 1100. There is a filter or separation medium 1104 which keeps the component 1102 separated from a granular or powdered component or essence 1106 contained in a sack or bag 1108 in the second compartment 1102. The second compartment 1102 can be formed in a laminated material which can be suitably bonded to the circumferential lip 1110 around the outside wall 1112 of the first compartment 1100. The circumferential lip 1110 is directed substantially at right angles to the wall 1112. The filter element 1104 provides suitable pores or apertures 1114 in the central zone of the cup portion 1100, and the peripheral ring or zone 1116 is relatively solid. The peripheral ring 1118 of the second component 1202 is bonded together with the peripheral ring 1116 and 1110 to provide a relatively sealed interface which is liquid impervious. The base of the second component 1102 also includes pores or apertures 1120 in a filter zone 1122 which is formed adjacent to as part of the second component 102. This laminated structure can be self-contained and include the two compartments for having the two components to be mixed under the action of a microwave. A separate cup or container can be provided for receiving the contents of the fluid emanating through the apertures 1120 after the action of the microwave.

Figure 13:
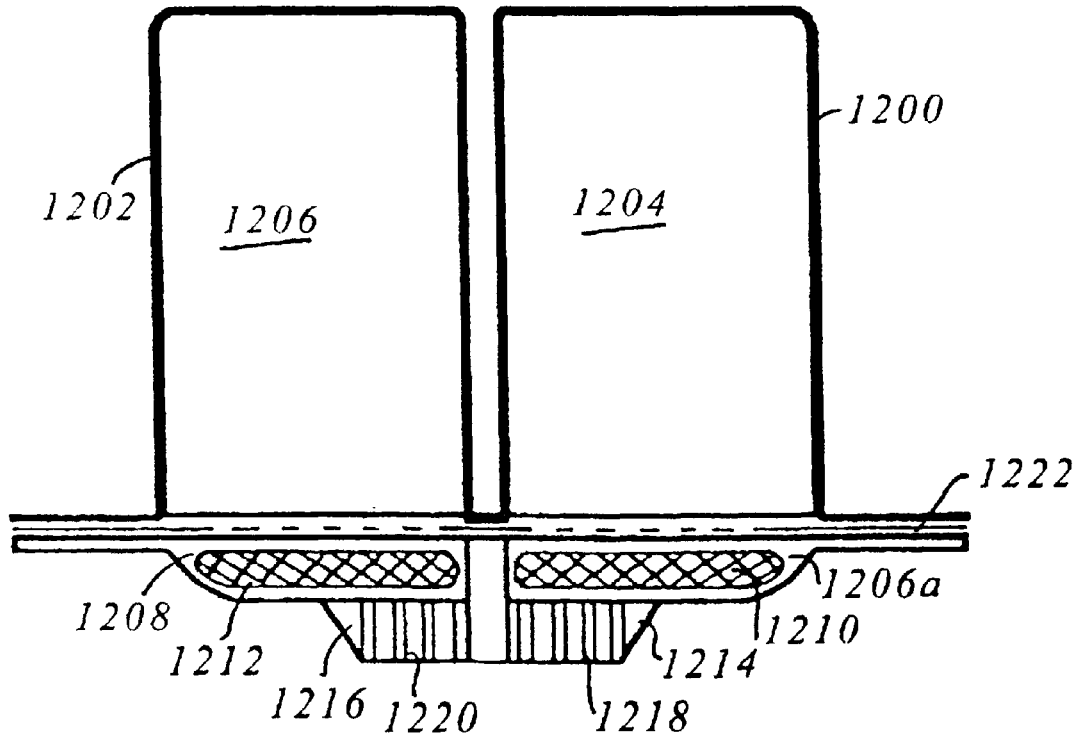
FIG. 13 is a sectional side view of a different device which has two separate compartments for containing two liquids in two compartments and for containing different granular materials which can be blended together. The device can be suitable for brewing alcoholic products when the appropriate components are put in different compartments. A separate cup can be used for receiving the contents of the device illustrated in FIG. 13.

In FIG. 13 there is shown a variation of the embodiment of FIG. 12. This variation is one where there are two liquid-containing compartments 1200 and 1202, each which contain respective liquid 1204 and 1206. Each liquid can be different, and it is required, and likewise, two second compartments 1206a and 1208 can be different in size and structure. In compartment 1206a there is a first granulated or powdered material 1210. In compartment 1208 there is a second powdered or granulated material 1212. These materials can be different as necessary.

There are respectively two filter areas 1214 and 1216. The liquid 1204, suffused with the granules or essence passes through the apertures or pores 1218 of filter 1214, and the liquid 1206, suffused with the granules or essence 1212, pass through the apertures or pores 1220 of filter 1216.

This device can also be formed as a laminated structure, and there is a filter or separation medium 1222 which separates each of the liquids 1204 and 1206 from the respective granular components 1210 and 1212. The laminated structure can be not sealed or not pressed in its construction. This can be a self-contained body component device, namely two compartments for two different kinds of liquids, two compartments for each of two different kinds of granulated materials, and respective separation areas between the respective liquids and dry granulated material, and thereafter respective dispensing or filtering elements.

In different formulations, some of the liquid 1206 could be urged through the components 1210, and some of the liquid 1204 could be urged through the compartment 1208 as may be necessary. In other forms of the invention there can be even more or additional liquid and/or granular compartments in the combination of elements.

As illustrated in FIG. 7, there is an exploded view of the format of FIG. 13 which shows the different compartments and their components separated. The separation of filter element 1220 has the separate zones 1224 and 1226 through which the appropriate liquids through each of the compartments 1200 and 1202 can be forced under the pressure of microwaves. This system could be used as a device for brewing alcoholic beverages such as beers or the like. For instance, the component 1204 can be liquid and the component 1206 can be a suitable extract. The granulated material 1208 or 1210 can be a suitable yeast or fungus to facilitate brewing or formulating alcoholic or other fermented product.

A separate container or cup can be provided for receiving the contents from the microwave oven. The separate cup can be provided for receiving the outflow from the filter elements 1122 or 1214 or 1216 as required. In this form, therefore, the configuration would be where the components 1100, 1200 and 1202 are placed on top of a receiving container.

Figure 14:
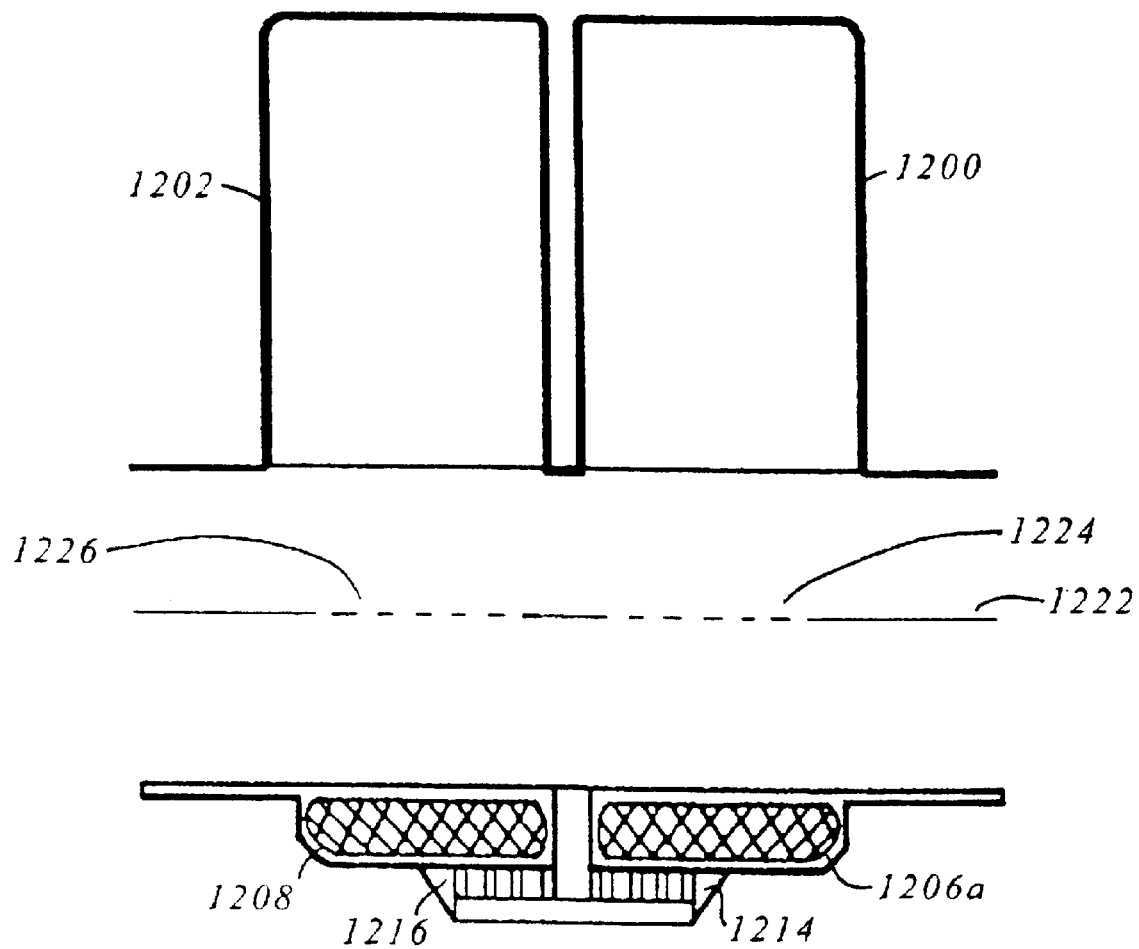
FIG. 14 is an exploded view of the device illustrated in FIG. 13.

In FIG. 14 there is illustrated a system for making products such as desserts. There is provided a device which has at least two cells, a first cell 1300 containing a solid-type component 1302 and a second cell 1304 containing a fluid 1306. Between the cells 1300 and 1304 there is separation membrane 1308 which can be provided with zones of different thickness. As illustrated, there are thinner zones 1310 and thicker areas 1312. The thinner areas 1310 can be punctured when liquid 1306 under the action of microwaves is caused to expand from the cell 1304 and into the cell 1300

In the cell 1300 the liquid would mix with the solid 1302, and a suitable dessert can be made in this fashion. The material 1314 for making one of the walls of the cell 1300 and the material 1316 for making the wall of the cell 1304 can be of a nature that bonds and binds with the material 1308 around the perimeter.

The materials 1308, 1314 and 1316 thus form laminate parts which can be effectively bound or bonded together around a periphery thereby forming within the periphery, the cells 1300 and 1304. As may be required, even more cells can be provided, and, for this purpose, different zones and different materials can be provided to make different compartments which can interconnect with compartments 1300 and 1304. Thereby, there could be three, four or five cells as required.

The separation material 1308, with areas of weakness 1310, can be provided between the different cells. Different amounts of weakness can be provided such that different amounts of fluid can pass from one liquid cell to the cell containing the solid material 1302. The mixing can be effected at an appropriate stage under the microwave action. Thus, fluid from cell 1304 could enter cell 1300 at a different time to fluid from a different cell entering the cell 1300. In this manner, different effects on the cooking can be provided.

As may be necessary, an escape valve can be provided to the outer wall of cell 1300 such that if there is excess pressure built up in the cell 1300 under the cause of the microwave action, a portion of the wall of cell 1300 can be separated. Thus, an area of weakness for the valve can be provided in the material of 1314 for that purpose.

Figures 15, 16, 17:
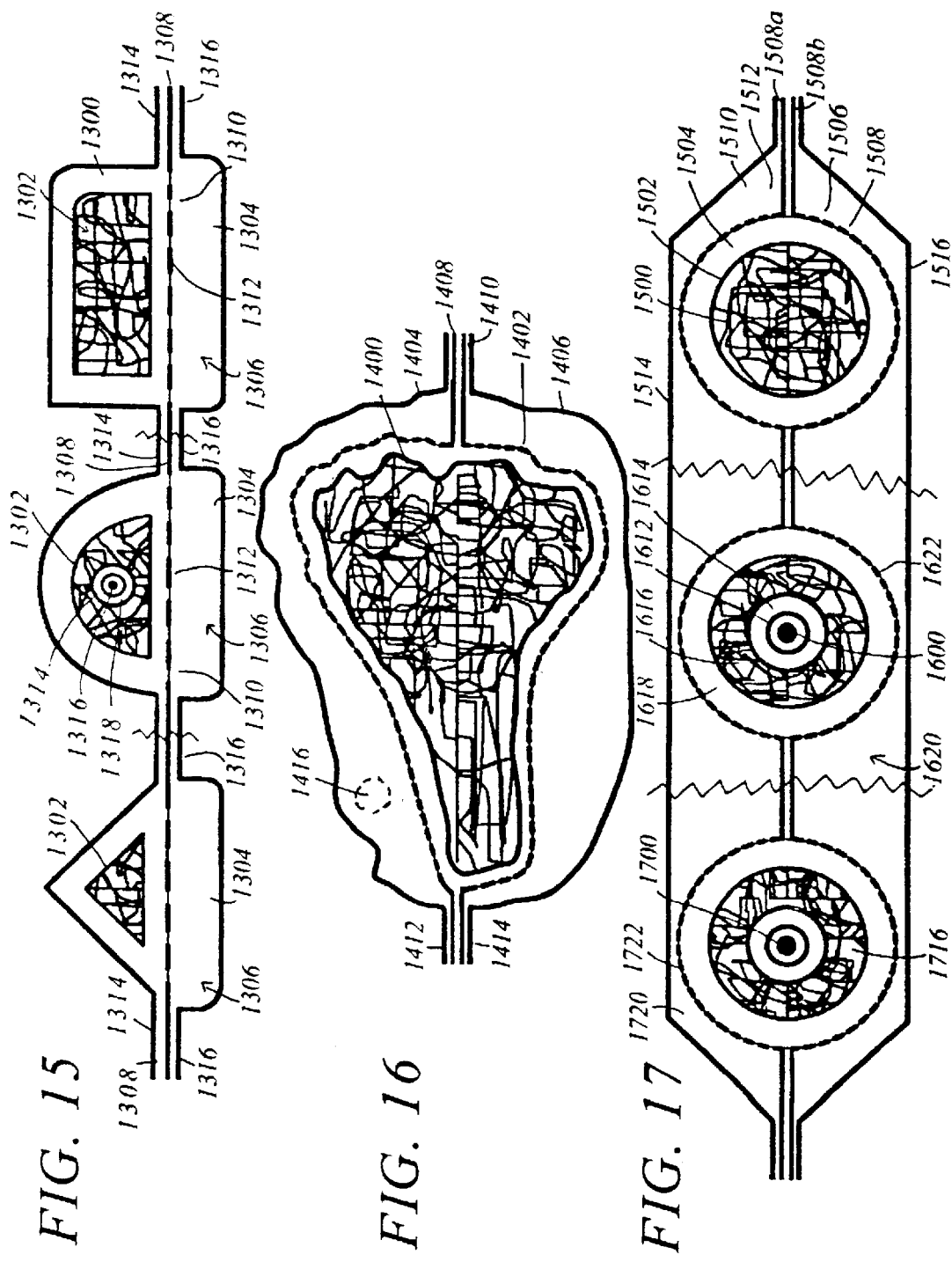
FIG. 15 is a side view of a device for preparing solid-type food components of which there are two or more cells or zones for preparing different products. The device shown in FIG. 15 illustrates three different kinds of products which can be produced.
FIG. 16 is a side view of a different configuration for preparing a vegetable product in the nature of broccoli. An escape valve is illustrated in the outside skin of one of the cells.
FIG. 17 is a sectional side view of another device for making different components and wherein there are multiple cells dividing the components prior to subjection to microwaves.

As illustrated in the central portion of FIG. 15, there is provided a solid food member. Contained within that solid member 1302, and contained within that relatively solid member, there is an additional 1314 which contains a component 1316 centrally located within the relatively solid member 1302. A liquid 1318 can be contained in a separate cell around the solid component 1316. Under pressure of the microwaves, this cell can be subject to breakage. The component 1316 in the central cell can then mix with the relatively solid material 1302. The walls forming the cell around 1316 can be made of a material which is edible. This configuration can be provided for making a fresh mozzarella cheese or other cheese.

In the configuration on the left hand side of FIG. 15, there is shown a format for making a dessert of a different shape or form. The relatively solid material 1302 can be of a different consistency to that shown in the configuration on the center and right hand side of FIG. 15. For use after the fluid has passed from the cell 2304 to mix with the relatively solid material, one or more of the films 1314 or 1316 or 1308 can be removed so that an edible product is provided in a suitably palatable manner.

The characteristic of this food preparation system is one whereby multiple cells are provided with several components which mix or are forced together under the action of microwaves, and thus complete the cooking and/or preparation process of a final edible product.

In FIG. 16 there is shown a configuration where a vegetable in the nature of broccoli 1400 is contained in a first cell 1402 within a second cell 1404 which contains water 1406. The wall of the cell 1402 containing the broccoli is formed by the wall members 1408 and 1410 which are laminated together with the wall members 1412 and 1414 forming the outer barriers of the cell.

A valve 1416 can be provided in the outer periphery of the wall 1412 so that if there is unnecessary build up of pressure under the action of microwaves, steam or water can escape from an area of weakness 1416. The valve breakage points can react to different temperatures. Thus, for some products, the valve may break at 60° C., and, in other instances, the valve may break at 80° C. A valve can also be placed for the inner cell 1402, namely on the wall 1408 or 1410. The valve 1416 can be located below, above or over the location of food 1400. The valve 1416 is required in all of the configuration of FIGS. 15, 16 and 17. More than one valve 1416 can be provided at different locations about the food. Each valve can be operated at different temperatures. When the valve breaks, liquid moves from one chamber to another, and air can go to another chamber.

In this matter, broccoli or other vegetables 1400 can be suitably cooked to the requisite degree with a requisite amount of water applied at the correct time so as to provide a suitable and tasty vegetable and fruit. The wall 12402 provides areas of weakness so that the requisite amount of fluid or water can penetrate the vegetable as necessary so as to prevent overcooking. One or more of the materials 1404, 1408 and 1410 can be removed prior to consumption of the vegetable.

In FIG. 17 there is shown a configuration for making other products. The component 1500 could be in the form of a dehydrated prefabricated food contained in the first cell 1502. Around that cell there is a second cell 1504 which is formed by a wall 1506 having zones of weakness 1508. This wall 1506 can provide a valve effect. The weakness areas 1508 can break when the pressure caused by the microwaves on the expanding fluids exceed the break pressure of the areas of weakness.

The third cell 1510, which contains liquid 1512, is formed by the outer walls 1514 and 1516 as indicated. The walls 1514 and 1516 and the wall 1508 as formed by each of the components 1508a and 1508b are bonded together in laminated fashion around the periphery.

As illustrated in the central portion of FIG. 17, there are different components which can be combined to make the food product. In a central zone there can be provided, for instance, a first product such as a component 1600 contained in a cell 1612. Second cell 1614 can be provided in which there is a first fluid or other component. Another cell 1616 can provide another solid component such as cheese. A fourth cell 1618 can be provided around that cell. In the cell 1618 there can be a different form of liquid or other component. A further cell 1620 is constituted for containing water or other suitable fluid. The wall 1622 can provide a suitable valve effect as described with regard to the configuration on the right hand side of FIG. 17 and wall 1506.

In the configuration shown on the left hand side of FIG. 17 there is a situation which is a repeat configuration of that shown in the central portion although the components 1700 may be a different food configuration than that in component 1600. Likewise, the wall 1722 may have different filtering or valve characteristics relative to the wall or valve characteristics 1622. Likewise, the fluid 1720 may be different to the fluid 1620, and the food component 1716 can be different to that illustrated in 1616.

The configuration as illustrated in FIGS. 15 and 17, while they show three different products in a series, can in fact be three separate items each having different configurations and components for cooking.

The invention can be used to prepare multiple different kinds of foods, special foods and dietary foods as may be necessary.

Many other forms of the invention exist, each differing from the other in matters of detail only. For instance, the components making the different cells can be disposable to different degrees and formed of edible materials as necessary. One or more of the components being mixed can be disposable and removable from the edible component after the effect of the microwaves on the preparation of cooking of the product. One or more valves can be provided to the walls of the cells, and different characteristics can be provided to permit mixing and blending of the different components from the cells at different times. Suitable pretreatment of the products can be provided to avoid deterioration prior to processing in a microwave, and as such, the shelf life of the products can be enhanced. The food may include meat or fish products. The products may be partly or wholly frozen prior to microwaving or partly or wholly precooked, seasoned or unseasoned. As may be necessary, one or more the components can in fact be reusable. For instance, where the component is for serving purposes—in the nature of a plate or drinking cup. Different seals can be provided to the cells to prevent premature mixing of the components. Moreover, different profiles of the fruit products and their containers can be provided. Where partially pre-prepared components are used, the container shape can be formed so as to help mold the final shape of the product and render it into a shape which is attractive and desirable for a consumer. Different connections between different components can be provided.

Some of these beverages may or may not include milk or dairy containing products. In other forms, the device can be used for injecting the essences of flavors into liquids in the form of flavored yogurts, flavored fruit juices, hot chocolate and similar products.

In the modern busy world it is desirable to provide devices that can be sold to a consumer for the quick preparation of hot beverages. Devices are known for making pots of coffee through a conventional electric element, but these are either slow or cumbersome for use by the consumer. Other devices are known for making espresso on a stovetop, and once again these are not of a consumer-friendly nature, such that they can be easily disposed of after use.

The device of the present invention can be used for providing hot drinks and/or drinks of different temperatures after their preparation in a microwave oven.

This invention also relates to a device system and method for use in and with a microwave oven for preparing and cooking digestible products such as beverages and foods. In particular, the invention is also concerned with a device for preparing beverages such as different coffee, coffee combinations, tea and tea combinations. Two or more components for the food or beverage can be combined to provide a desirable food or beverage. In other forms, the device can be used for adding essences of flavors into liquids, which can include milk products, fruit juices or the like. Moreover, the device can be used for brewing and fermenting purposes and for preparing and cooking solid food products and desserts.

It is desirable to provide a device as to a method which consumers can use for quick preparation of beverages and digestible foods which can include complete or other meals. A microwave oven is a useful device for facilitating quick preparation and/or cooking of food, and the invention uses the characteristics of a microwave oven to prepare desirable hot beverages, drinks, foods, desserts and other nutritional products.

Figure 11:
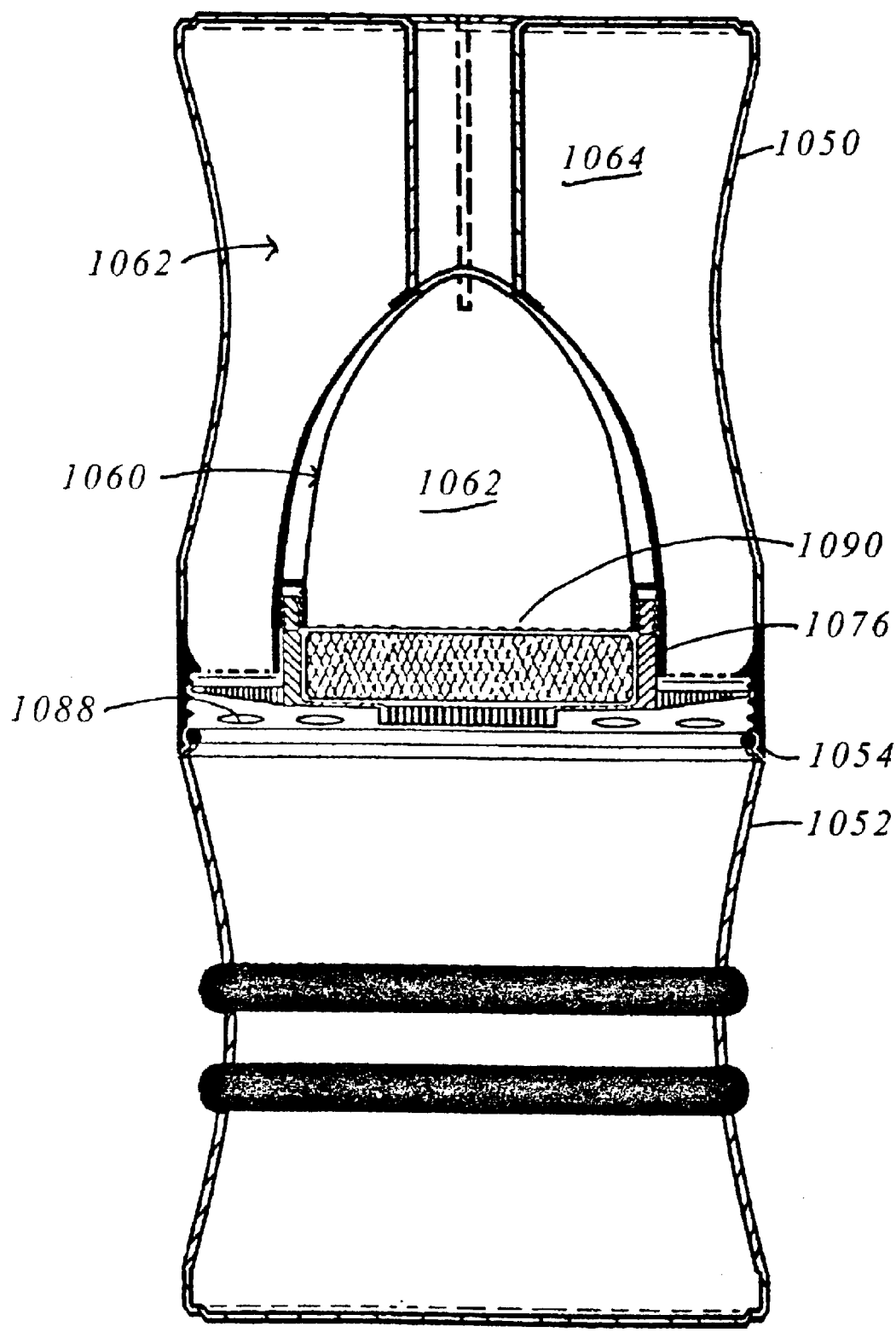
FIG. 11 is cross-sectional view of the device of FIGS. 10A and 10B in their assembled state.
Figures 18A, 18B:
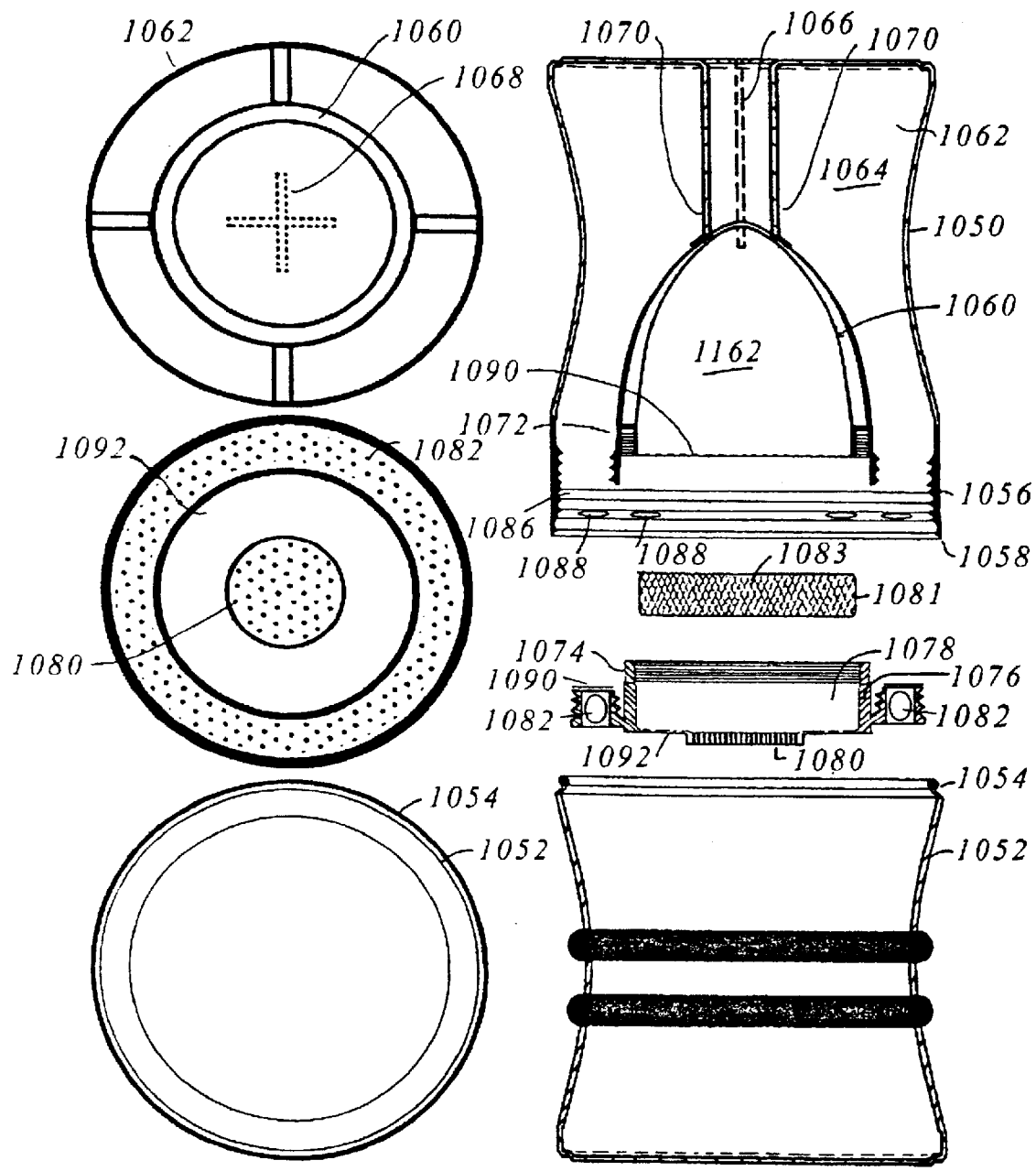
FIGS. 18A AND 18B are variations of FIGS. 10A and 10B.
Figure 19:
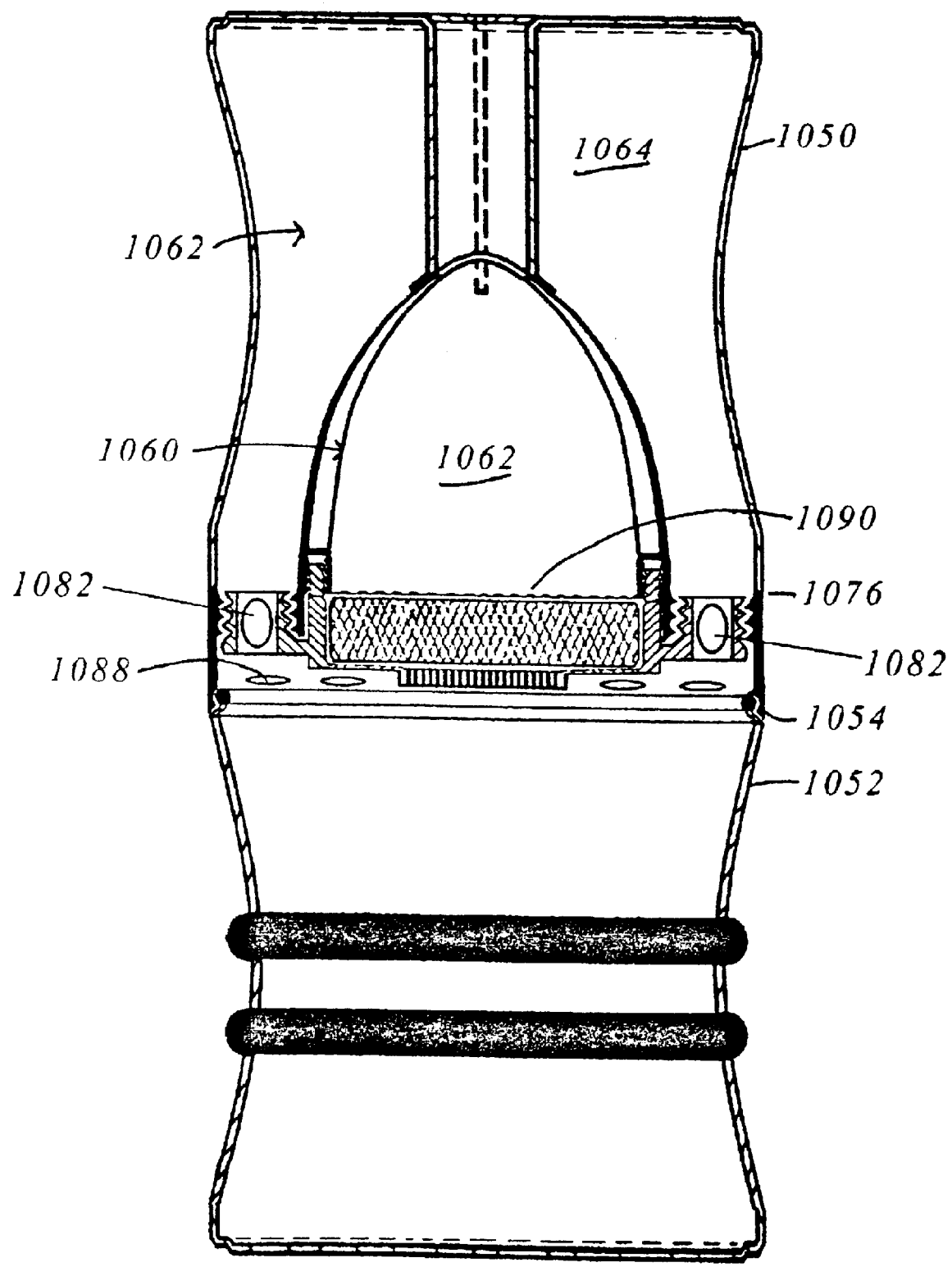
FIG. 19 is a variation of FIG. 11.

In FIGS. 18A, 18B and 19 there is a different configuration relative to FIGS. 10A, 10B and 11. The center part where the essence is received has a hollow chamber 1082 formed as a ring around the central portion. The ring type donut 1082 can be found as one or more components. It can be tubular in cross-section mode out of mesh, formed metal or plastic material. It can facilitate liquid, such as milk, being caused to foam when under pressure and passing through the mesh, which is effectively a double mesh, namely one on the top portion and the other portion of the donut. Instead of tubular cross-section, other flat or straight or elliptical cross-sections can work.

In some cases, the container can be provided with or without liquid, or with or without the food or drink essence. Also, when the liquid is provided, it can be supplied in one portion, for instance, the bottom portion of the device, and when used in the microwave, it can be reversed such that the liquid is on the top. Under the action of the microwave heating the liquid flows down through the essence into the cup or tray below.

In other variations, for instance, in FIG. 12 or FIG. 13, the containers 1112, 1200 and 1202 may be provided at the top with separable lids for one or more of the containers, which can be screwed or pop-snapped to the sides of the walls of the containers. This permits liquid to be added. The same applies to other embodiments, for instance, in all figures for liquid containers.

Figure 20:
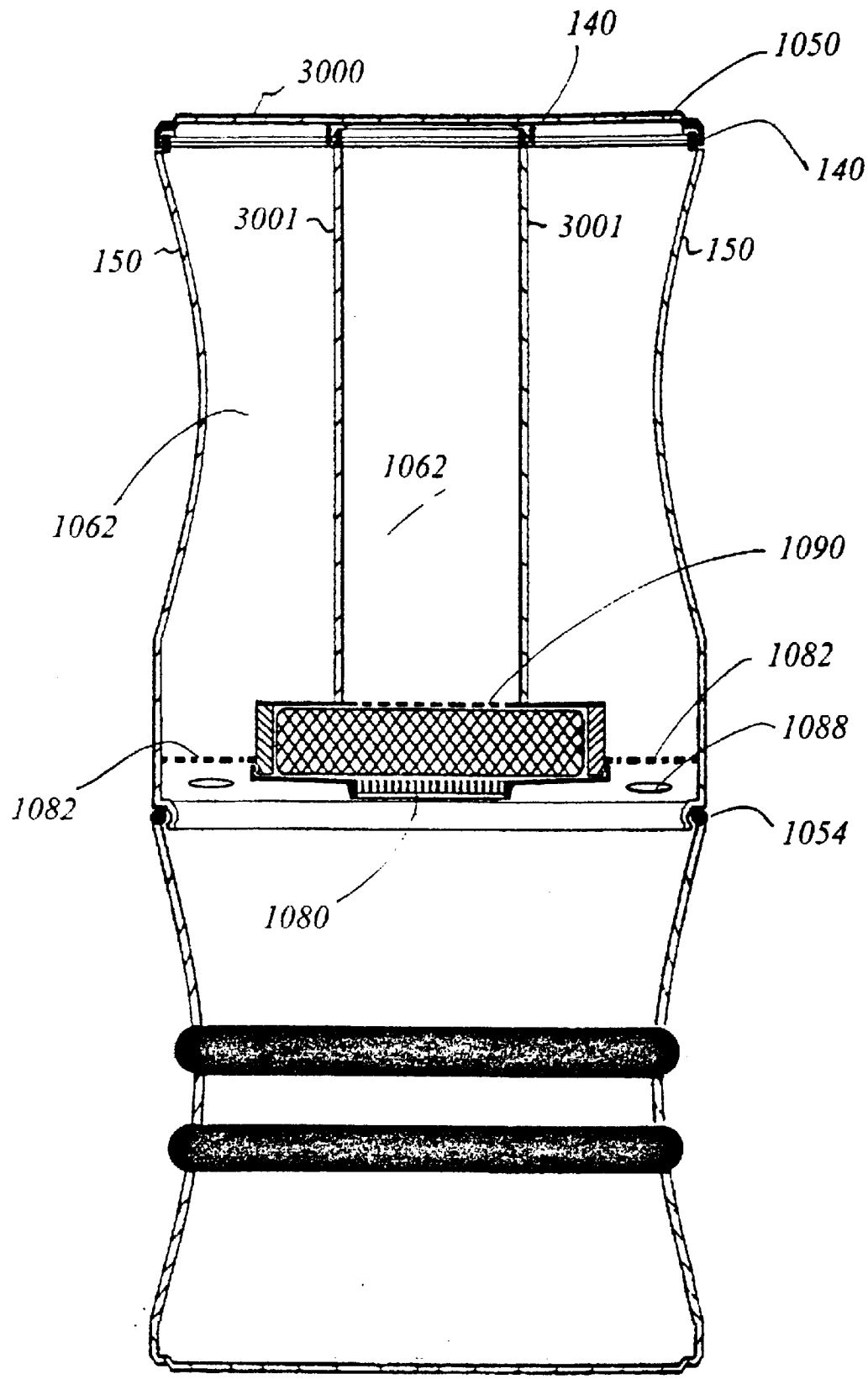
FIGS. 20, 20A and 20B show a configuration where there are different elements making up the container components. The elements being relative separable and being connected with a threaded screw arrangement.
Figures 20A, 20B:
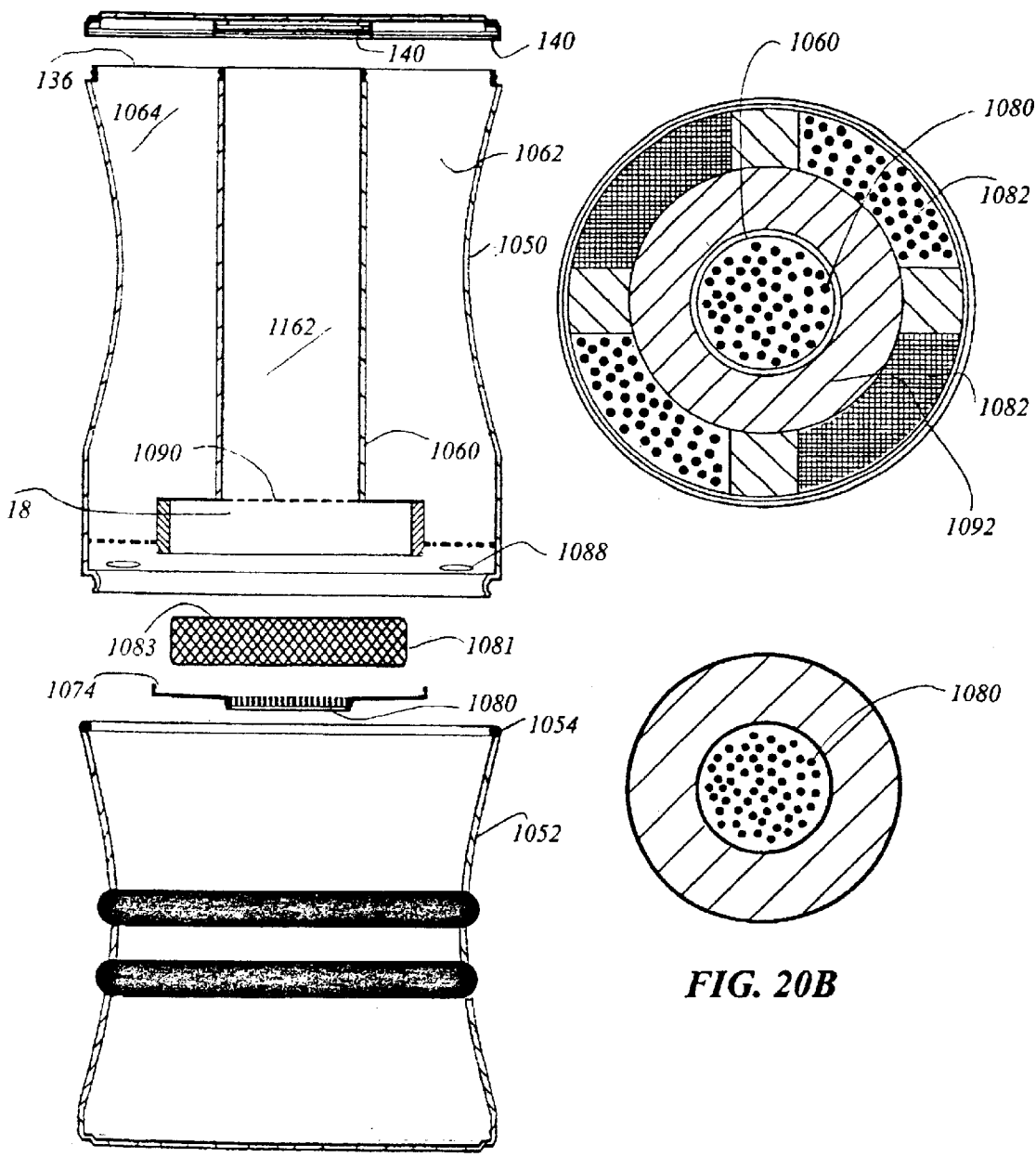

FIGS. 20, 20A and 20B show a configuration where the uppermost container has a removable base or plate. The base component 3000 is screw threaded at zones 140 to the wall 150 and also the central wall or passage 3001. As such, this is removable as required.

Figure 21:
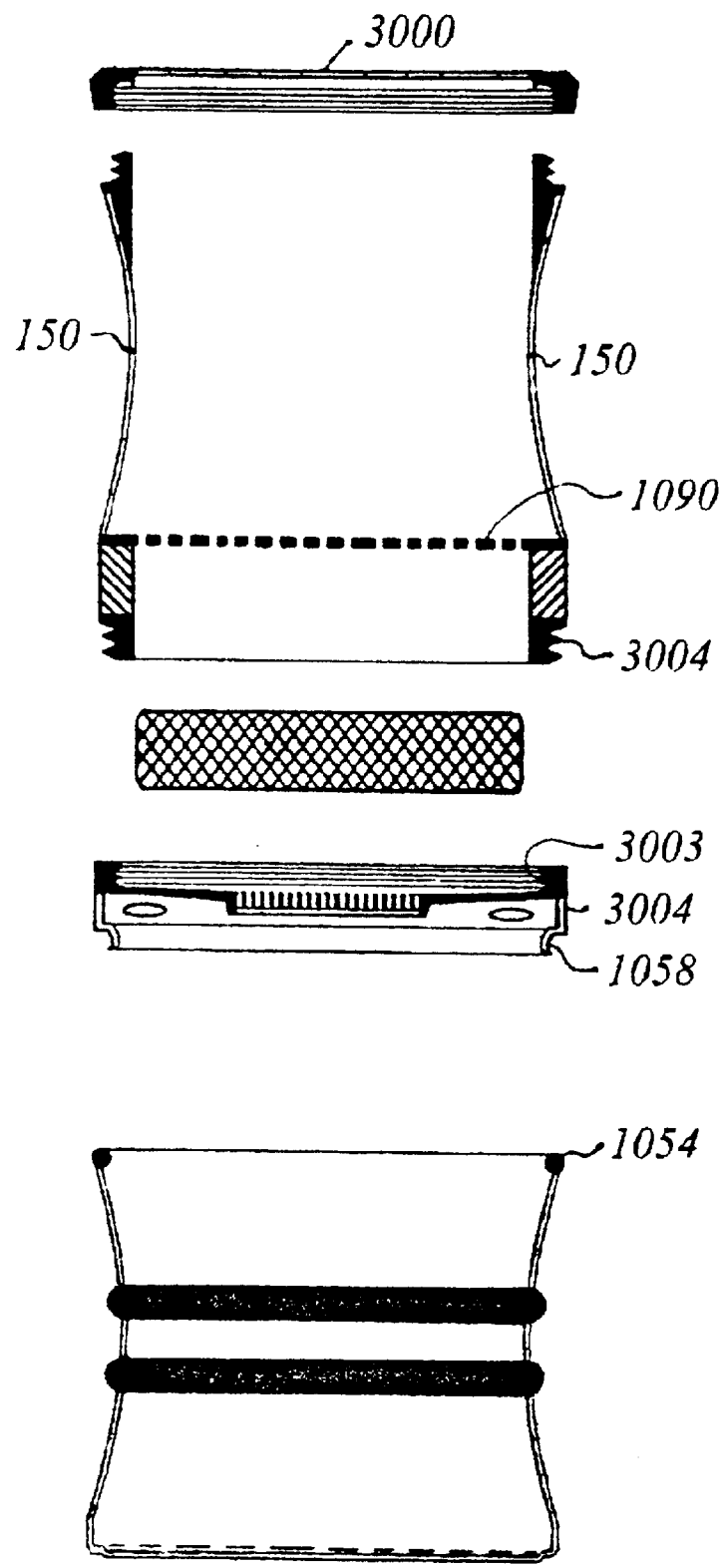
FIG. 21 is an arrangement showing different components where one of the containers has a removable lid. The lid being screw threaded.

In FIG. 21 the base 3000 is shown screw threaded to the walls 150. There are no central walls in this configuration. A central portion 3002 has an internal thread 3003 which mates with a male thread 3004 on the base of the top component or container. The lip 1058 is an internal lip which mates with a sealing ring 1054 as required.

Figure 22:
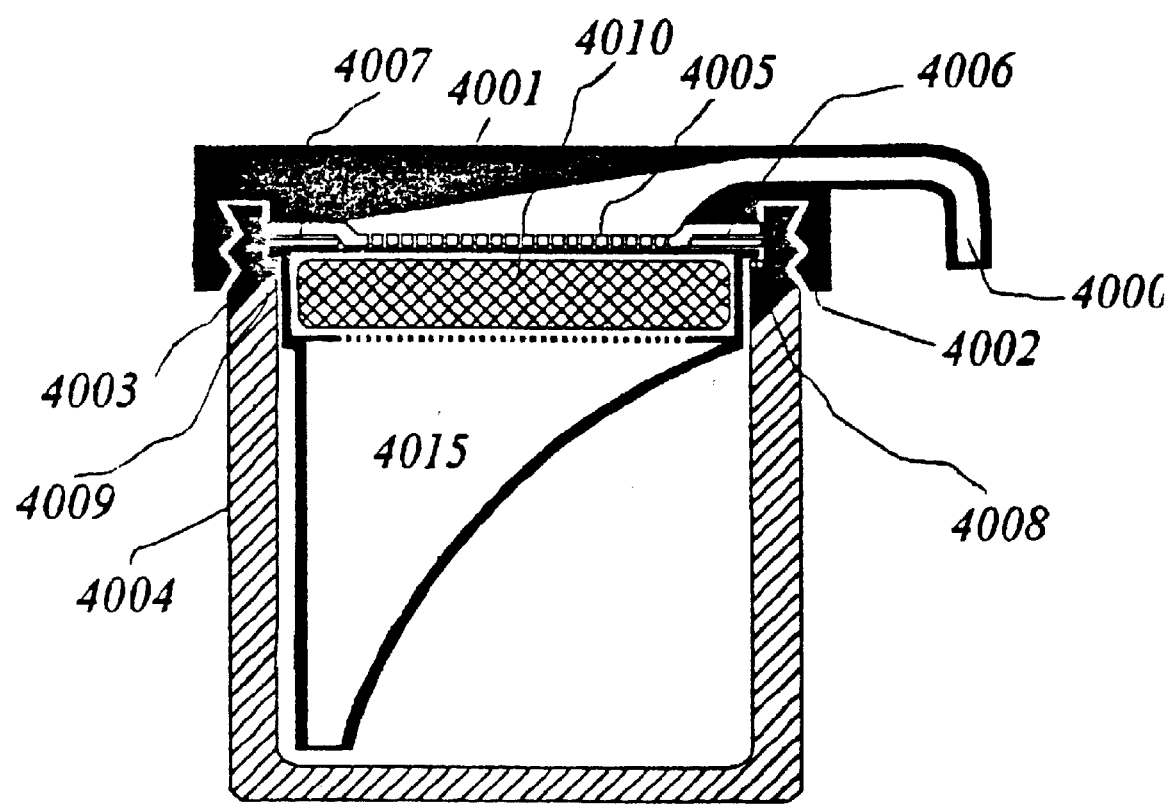
FIG. 22 is an arrangement where there is a container and a spout, and wherein one container is located within a second container.
Figures 22A, 22B:
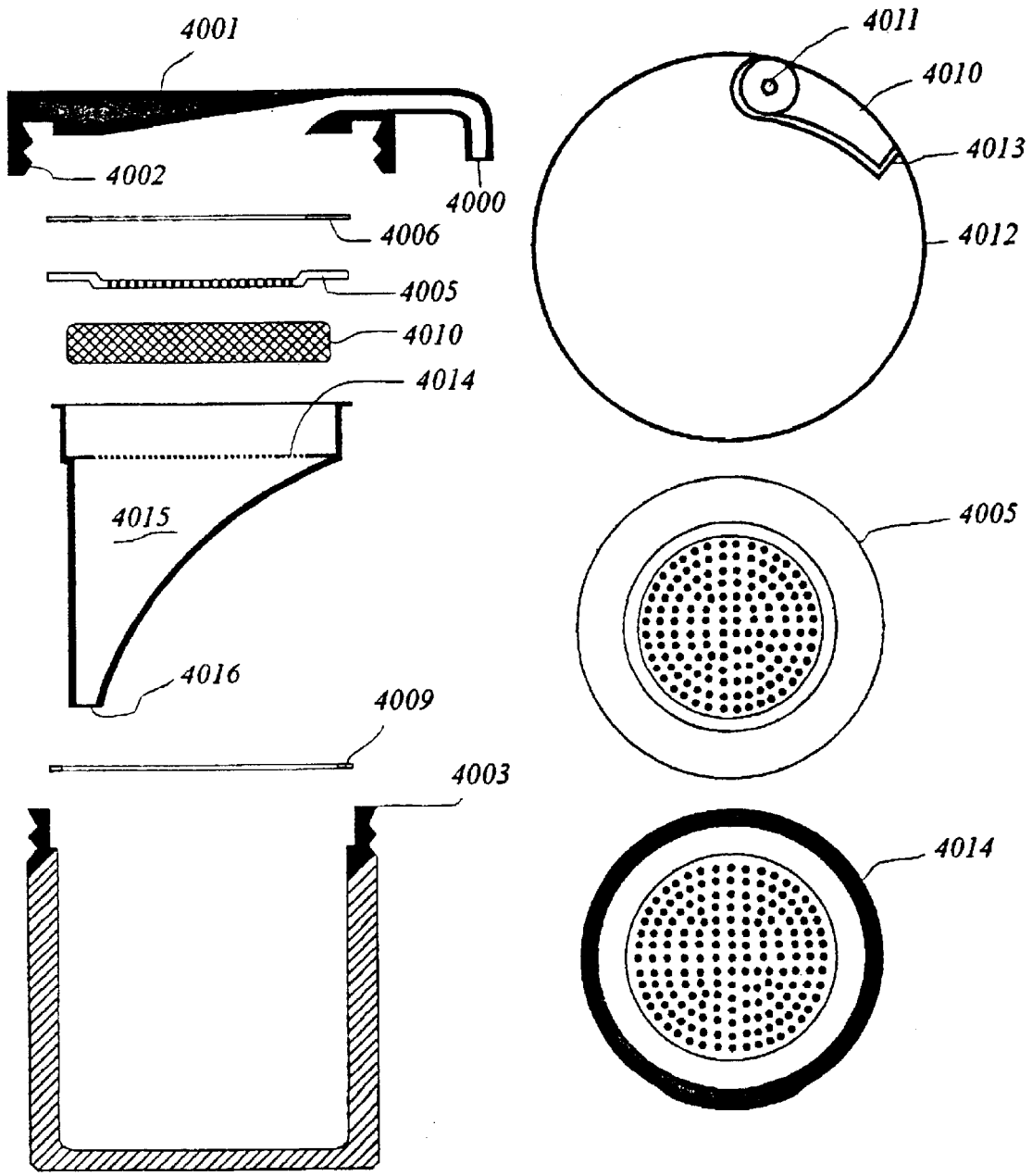
FIGS. 22A and 22B are exploded views of the arrangement with a spout.

In the configuration shown in FIG. 22A, there is a spout arrangement 4000 which is formed in the outlet to a cover member 4001 which provides an internal threaded portion 4002 to mate with a male threaded portion 4003. The threaded portion 4003 is at the top or leading end of a glass or plastic container 4004. A separate filter element 4005 sits between the cover element 4001 and a gasket 4006 which is supported on a tray like element 4007 which is itself supported on a gasket 4008. Coffee or tea is contained in the bag 4010. The spout 4000 can be constructed to swivel or pivot about a pivot 4011 in any desirable manner between a position contained within the circumference 4012 of the device as shown in FIG. 22B or the extended position as shown in FIGS. 22 and 22A. A suitable housing 4013 is provided to receive the spout 4010. The pivot 4011 can have a suitable interlocking feature, so that when in the closed position as shown in FIG. 22B, no fluid can be expelled. In the open position, fluid can be expelled. In the open position as shown in FIGS. 22 and 22A, there can be a relatively uniform unimpeded flow from the contents of the container 4004 through the spout exit 4000. The filter 4005 sits about the coffee bag 4010 which is located above a filter 4014 which is formed as a partial cover to a funnel container 4015 which is offset from and sits to one side in the container 4004. An inlet 4016 is provided to the funnel so that fluid from the container 4004 can pass into the front as required.

Figure 23:
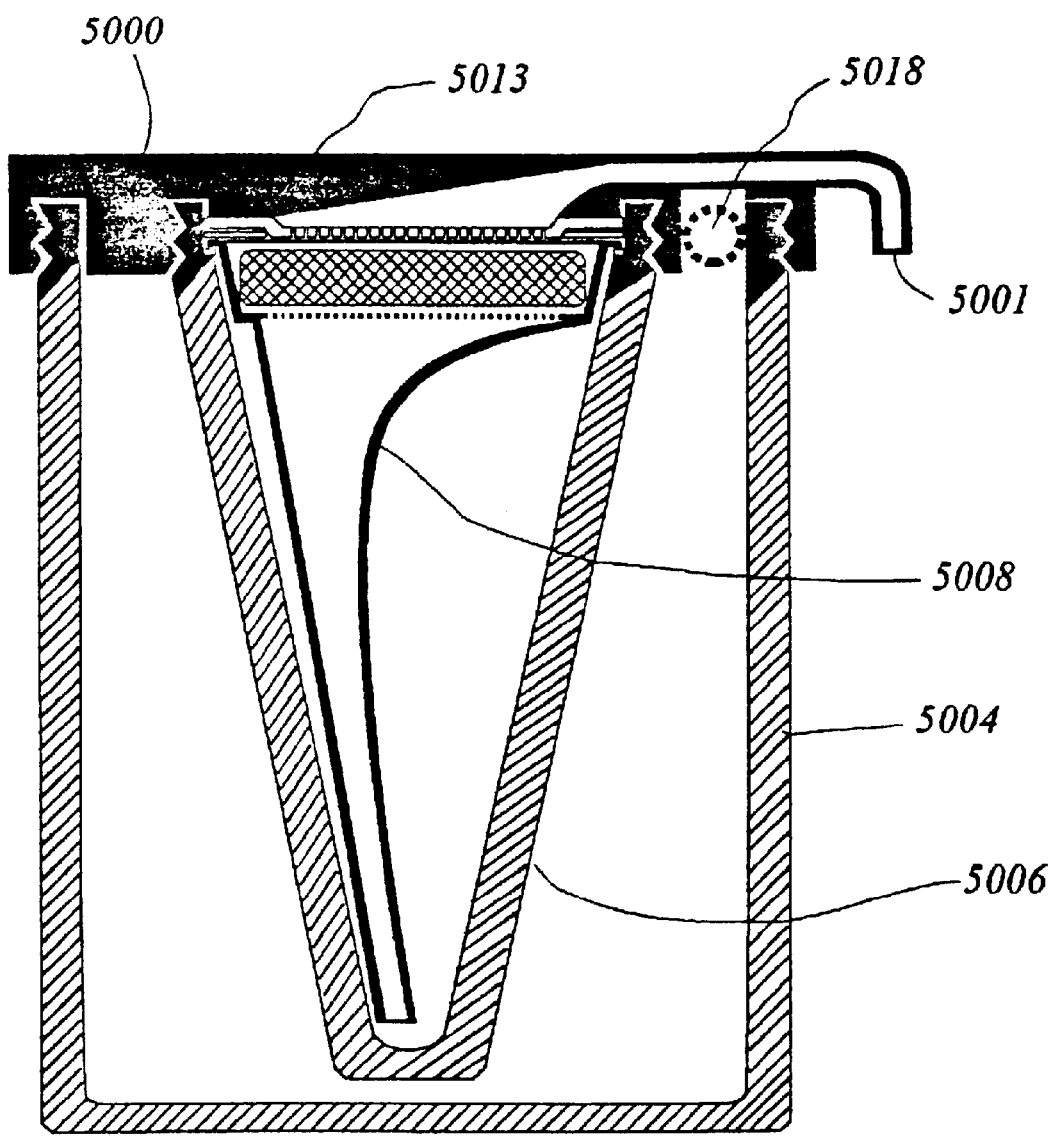
FIG. 23 is a cross-sectional view of a different arrangement with a spout and the shape of the container configuration is different.
Figure 23A:
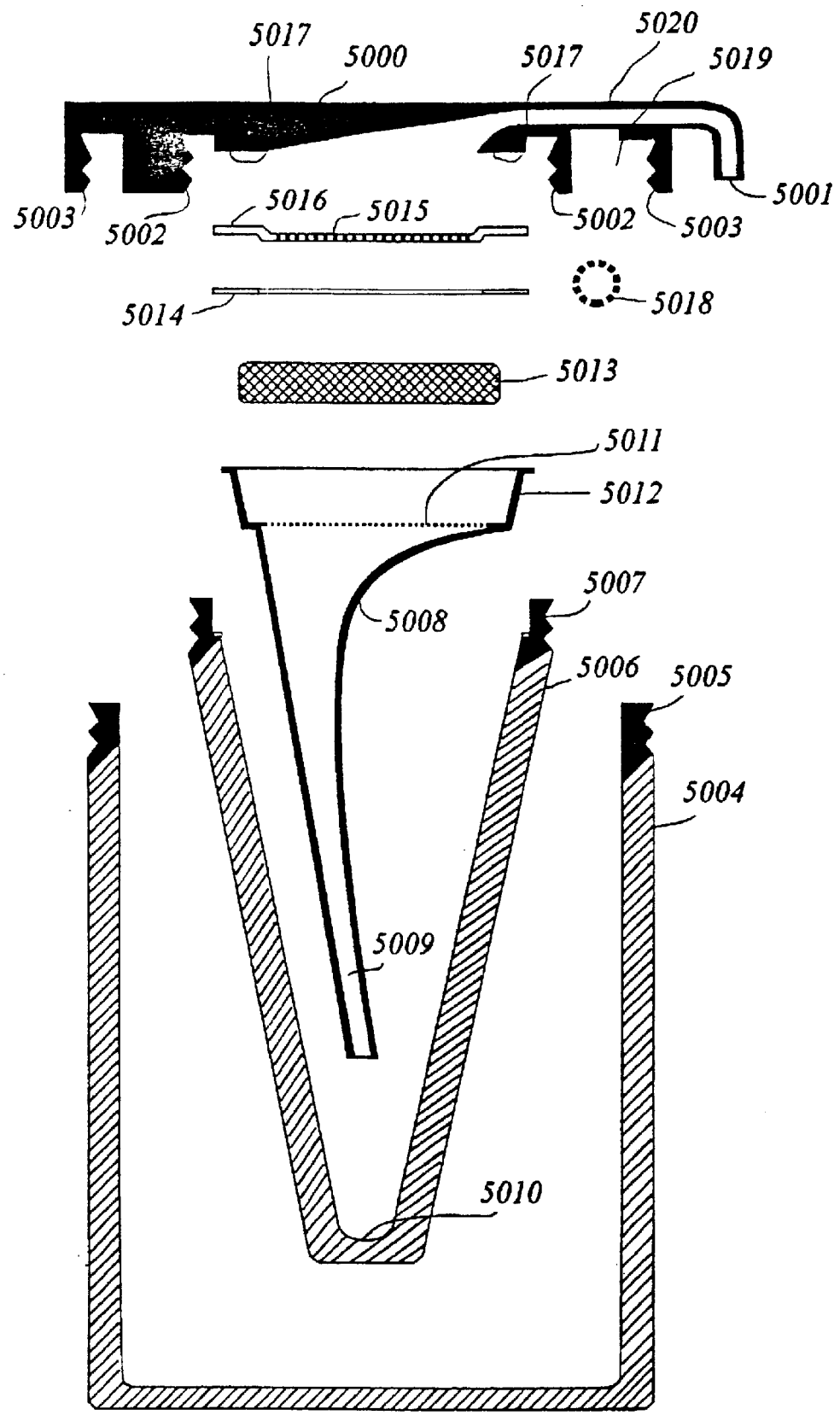
FIG. 23A is an exploded view of the arrangement of FIG. 23.
Figure 23B:
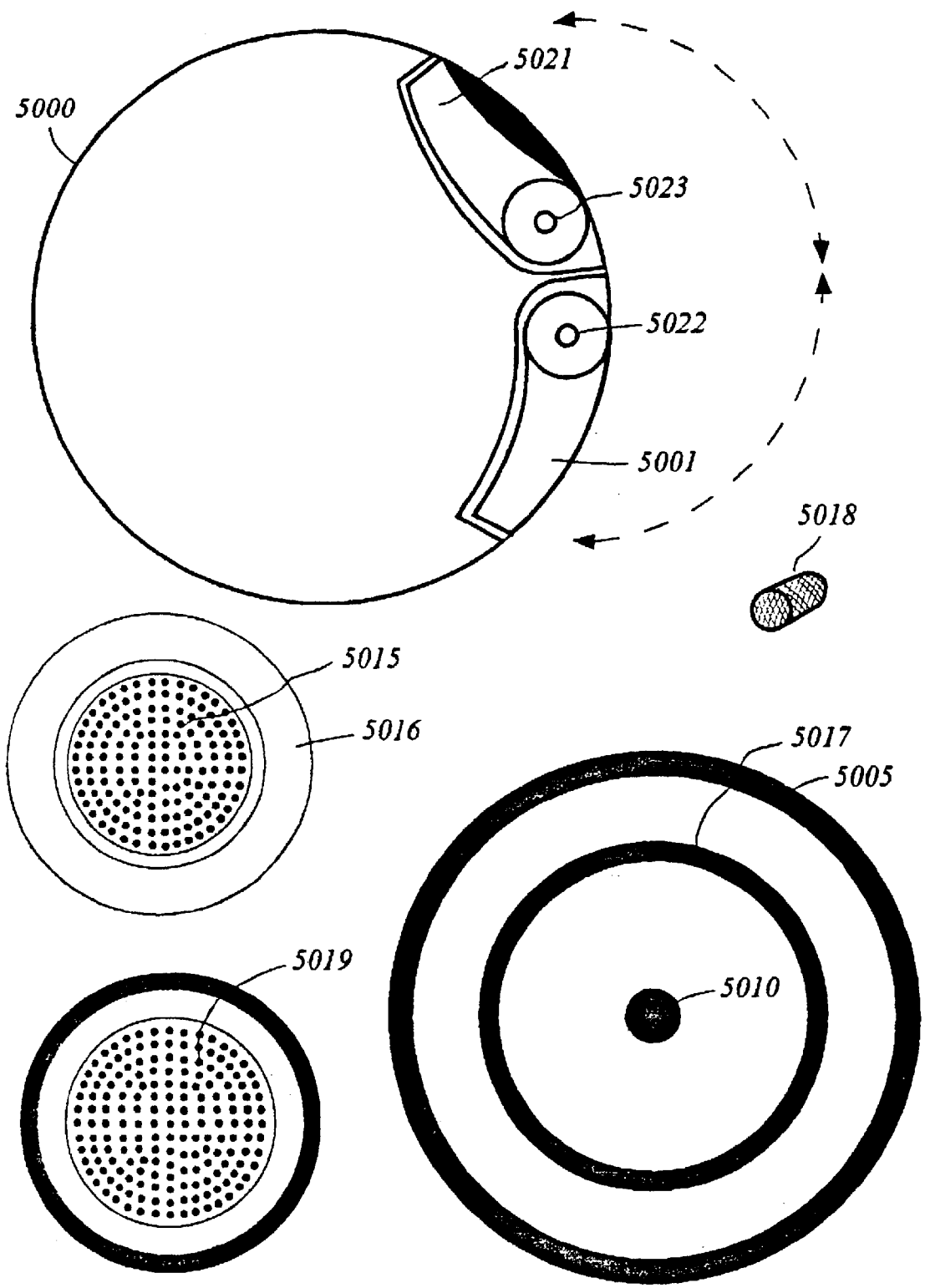
FIG. 23B is an arrangement where there are two spouts to the container.

In FIGS. 23 and 23A there is shown a different configuration for using a funnel device in a container. There is a cover member 5000 which has an outlet spout 5001 which is suitable pivoted between an inward position and an external position. It is shown in the external position in FIG. 23. The cover member has an internal female threaded portion 5002 and an outer female threaded portion 5003. There is an outside container 5004 which can be of glass or plastic and has a male threaded portion 5005 for engaging the female threaded portion 5003. There is also an internal container element 5006 which is substantially triconically shaped and which has at its leading edge a male threaded portion 5007 for engaging the female portion 5002. Within the conical element 5006 there is a funnel portion 5008 which has a store like element 5009 which is directed towards the base 5010 of the container 5006. At the top of the funnel element 5008, there is a filter tray 5011 which has a lip or rim 5012 for receiving a coffee bag 5013. Above the coffee bag 5013 there is a ring-like gasket element 5014 and above the ring-like gasket element there is a filter 5015 which has a circular rim or ridge 5016 which cooperates between the gasket 5014 and the base 5017 of the cover member so as to effect sealing of the configuration. There is also a ring filter mesh with the formation 5018 which fits into the aperture zone 5019 through which a liquid such as milk can be forced under pressure so as to create a firming effect when it enters the outlet tube of the spout 5001. The configuration of this embodiment is useful to make products such as cappuccino and cafe lane. In this manner, the cover or top 5000 can be provided with one or more outlet spouts 5001 and 5021 which pivot respectively about swivel elements 5022 and 5023. As shown in FIG. 23B the spouts 5001 and 5021 are housed within the perimeter of the cover member 5000. In some cases only one of the spouts may be used. For instance, where spout 5001 is used the device can be used to make espresso. Where both spouts 5001 and 5021 are used a combination beverage can be provided. The combination being the combination of two different fluids in the respective containers 5004 and 5006. The filter 5019 acts as a tray for the packet 5013.

As indicated in the example of FIGS. 22 and 23, the device can be used with a separate container or cup to receive the beverage which is heated up in the containers.

Figure 24:
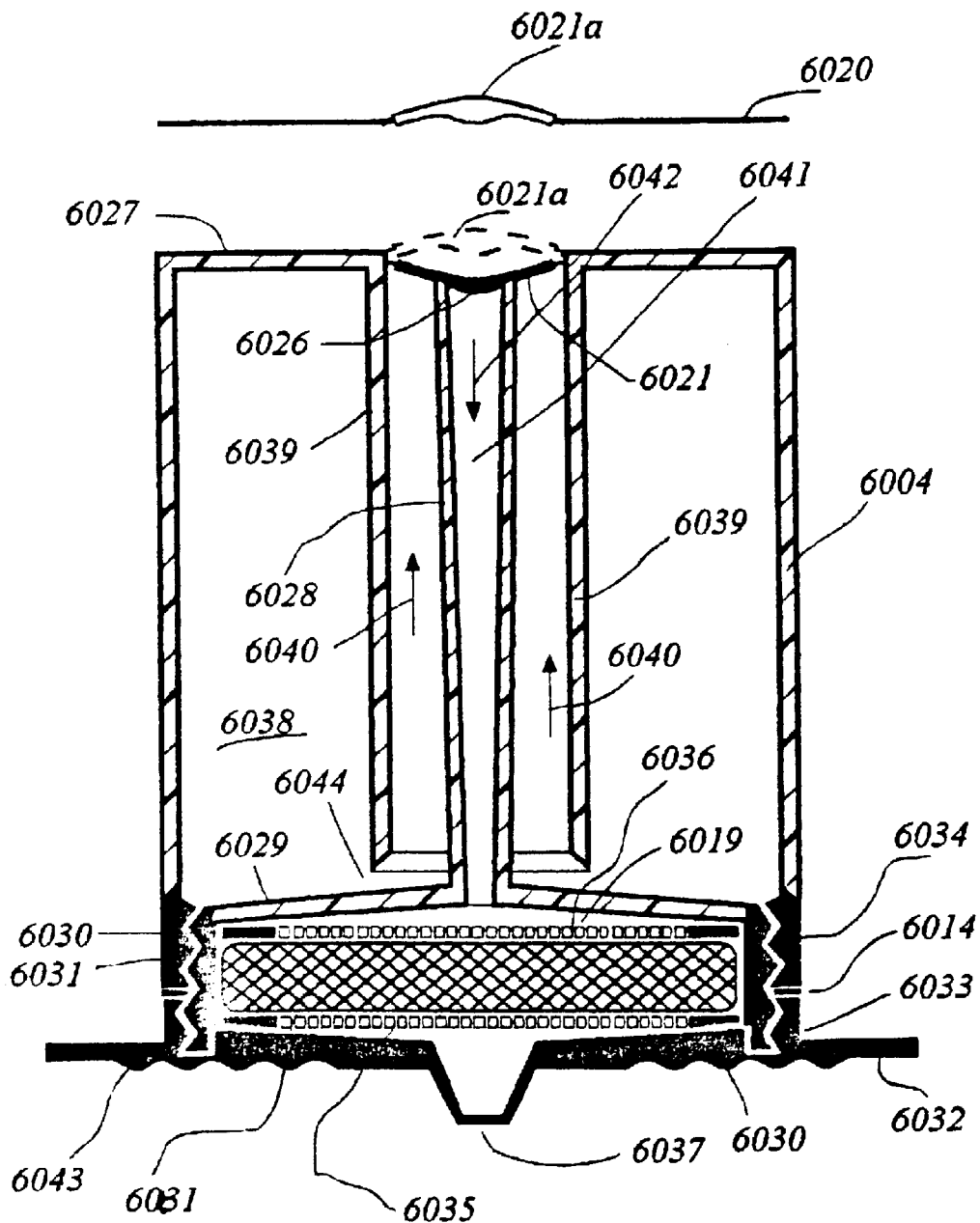
FIG. 24 is a cross-sectional view of a different form of system for producing a liquid beverage in a microwave oven.

In FIG. 24, there is shown a system whereby there is a container body 6004 with a side wall and a base 6027. In the base 6027 there is an element 6021 which is movable between a closed position as shown in the symbol position of FIG. 24 and an opened position as shown in the view 6024a. A representation of line 6020 is the representation of the movement of the base 6027 between the position as shown, namely in the open position 6021a and in the closed position 6021.

There is also a second element 6028 which has a base 6029 and an upward spout 6028. The mouth 6026 of the spout 6028 interacts with the valve 6021 which can move between the closed position 6021 and 6021a as illustrated. The base 6029 includes a threaded male portion 6030 which engages with a female threaded portion 6031 which is at the one end of the container 6004. There is also a closure member 6032 which has a threaded portion 6033 for engaging with the male thread 6030. Between the end 6034 of the container 6004 and the thread 6033 there is a gasket 6014. In the cavity 6019 that is formed between 6029 and the base 6030 there is located a coffee bag 6081 which is mounted between two filter elements 6035 and 6036. The base 6030 has an outlet spout 6037.

Water is located in the cavity 6038 and the valve 6021 is in the down position to act as a closure as indicated in FIG. 24. Pressure that builds up from the boiling water or steam in the cavity 6038 is forced between the wall 6039 and the wall 6028 as indicated by arrow 6040. When the pressure is sufficient, it causes the valve 6021 to open to position 6021a as indicated. The water and steam is then forced down the cavity 6041 as indicated by arrow 6042. It passes through the filter 6036, the filter bag 6081 included in the coffee and the final filter 6035 and then exits as a coffee essence through a funnel 6037 into a cup which can be separate or part of the unit. There are wave like formations 6043 at the base of the plate 6030. This permits excessive steam or the like to pass from the cup below plate 6030 and underneath the plate 6030 without causing undo pressure to build up.

Figure 24A:
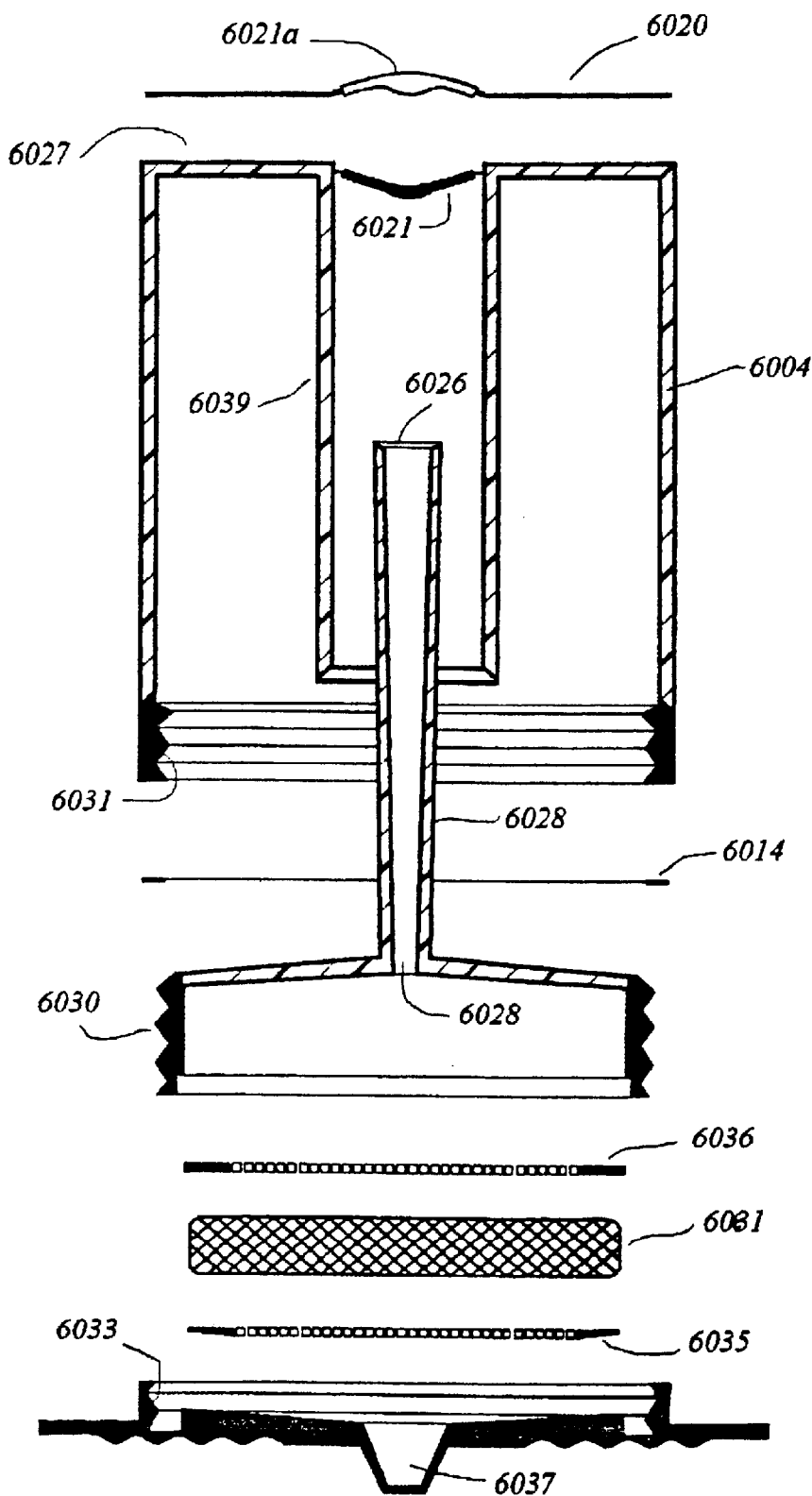
FIG. 24A is an exploded view of the components comprising the unit of FIG. 24.

Thus, in FIGS. 24 and 24A there is shown a system where element 6021 acts as a pressure relief valve which can flip up and down as indicated. This operates only when sufficient pressure is built up in the container 6038. There is sufficient space 6044 provided below the wall 6039 and the floor 6029 so that water can be left in the system to create steam and pressure up the shaft formed in the container.

The device can be used not only for making a coffee product, but also other liquid products, for instance alcohol.

The system can also be used where there are multiple chambers, such as a coffee product in the nature of cappuccino. There could be a second chamber for containing milk. The essence of the arrangement of FIG. 24 is an elongated path for building up steam pressure as indicated.

Figure 25:
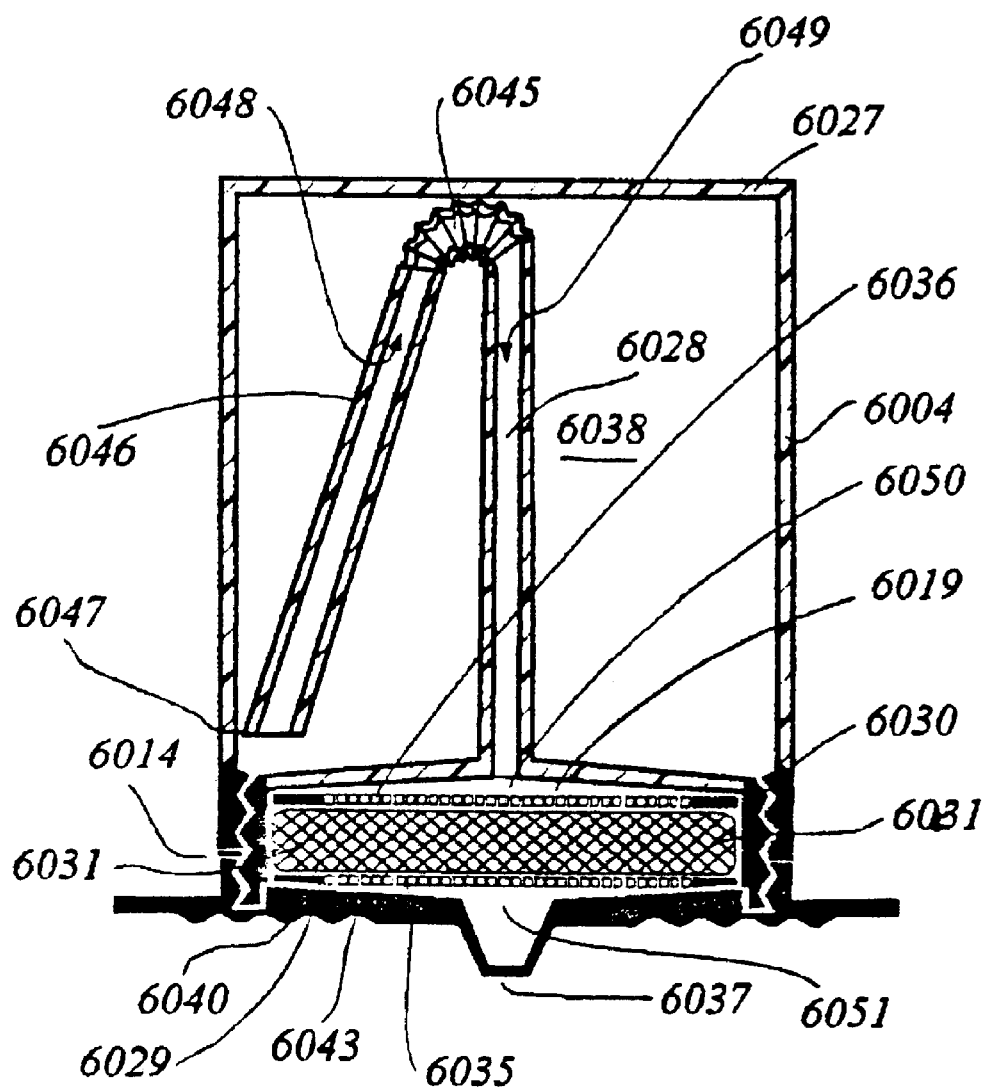
FIG. 25 is a cross-sectional view of a different form of container for producing a beverage in a microwave oven.
Figures 25A, 25B:
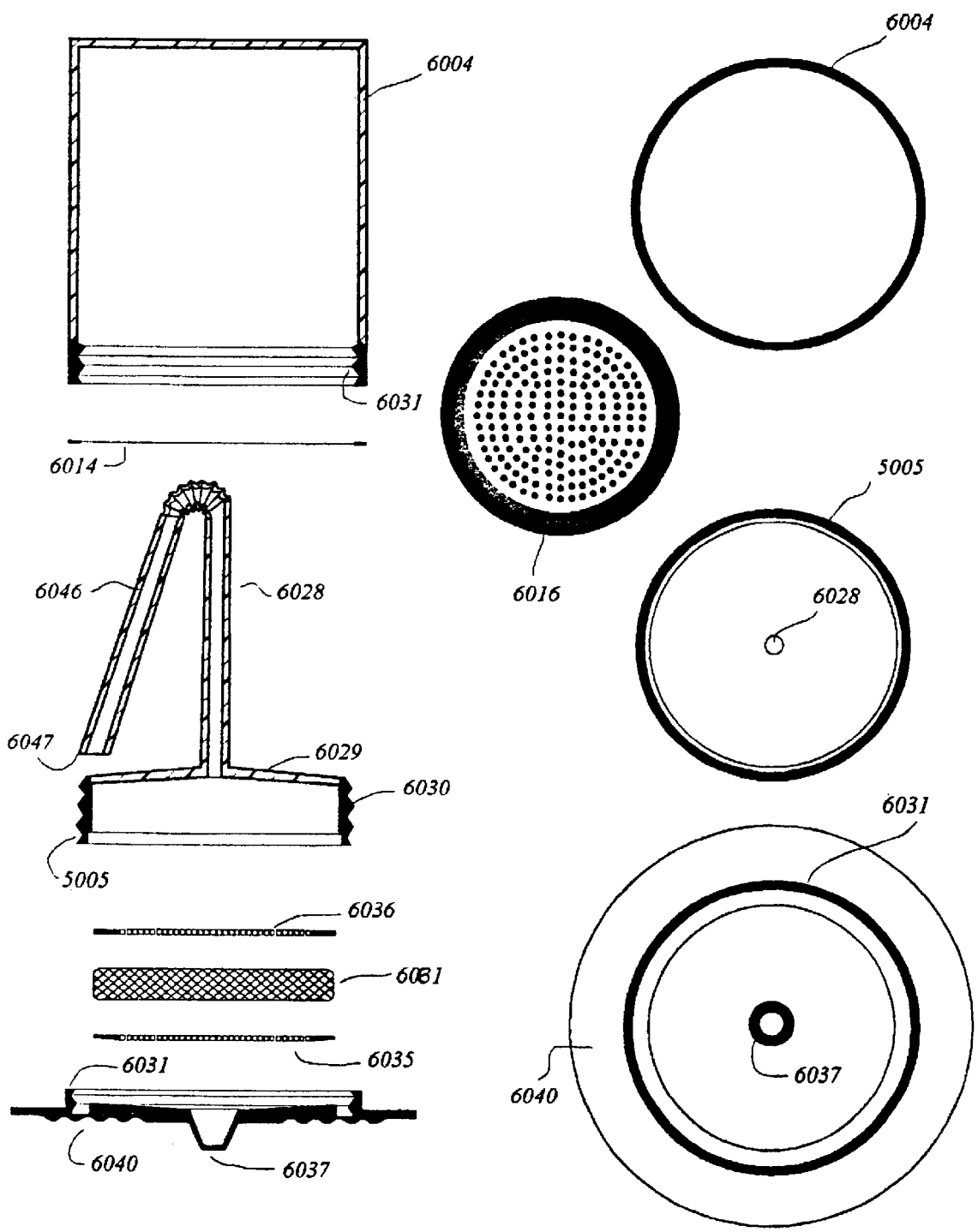
FIG. 25A is a cross-sectional view of different components in an exploded environment for use in the configuration of FIG. 25.
FIG. 25B is a top view of the sum of the components applicable to the configuration of FIG. 25.

In FIGS. 25, 25A and 25B there is shown an alternative arrangement for increasing the fluid path. In these figures, the spout 6028 has at its top a curved portion 6045 which connects with the downwardly directed spout 6046 which has a mouth 6047 spaced above the plate 6029. That spacing is sufficient to build up the head of steam that may be necessary to push the liquid up the spout 6046 as indicated by arrow 6048 and down the spout 6028 as indicated by arrow 6049. The head of water or steam would be left in the container body 6038 as necessary. Similarly, there is the space 6050 which is below the plate 6029 and above the filter 6019. That chronicle space is also useful to facilitate the effective flow of liquid through the filter and coffee system. Similarly, there is a space 6051 below the filter 6035 and above the funnel 6037 for similar effect. The arrangement of the elongated tube 6028 and 6046 for extending the fluid path to build up the pressure of the steam as illustrated is likewise useful to provide an effective end product.

In the configurations shown., for instance in FIGS. 24–25B, the relationships of the components is such that the fluid is located on the top and there is a downward movement partly under gravity of the boiled liquid and/or steam to make the beverage in a container located below the device. Thus, it is the downward movement of the fluid that facilitates an improved product.

The device can be reusable several times or intended for single use operation.

In different aspects of the invention, the characteristics and/or contents of the food component may need to be changed to facilitate microwave processing and/or cooking. Thus, coffee can be prepared in espresso and/or cappuccino form in a microwave by having the coffee granules and/or beans preprocessed so that the extract and/or flavor can be obtained at temperatures in the range of 100° C. to 130° C. Normally, such effect is obtained at about 170° C. or more, which is not a normal temperature for conventional microwave operation. Normal espresso products are formed at about 170° C.

In any one or more of the embodiments one or more of the components can be made of a material which can expand or shrink under the action of heat. While having this relationship, a component which normally contains water or any other liquid at a normal temperature can be forced, for instance, to contract as heat is generated. This causes the reservoir to increase under pressure and for fluid to be ejected from that reservoir. In this sense, the material acts as a system for helping to pump fluid from the reservoir into a different chamber. Different kinds of materials are known which can act in this fashion. The material can have a memory type characteristic, which can cause this movement of one or more walls of the material as required under the action of the microwaves and/or heat generated by the microwaves. In some cases, one or more of the elements can be made of laminates of material having different reactive characteristics under heat or different temperatures based on the different end products. For instance, under the examples shown in FIGS. 24–25, the walls of the container 6004 could be of the material such that the material contracts to thereby reduce the volume of the cavity 6038, and thereby force fluid under the pumping action caused by decrease volume of the cavity through the different channels and elements. The water and/or steam can pass through the filter 6036, filter bag 6081 and final filter 6035 to exit into a cup or separate unit associated with the device.

The material of one or more compartment can shrink causing an increased pressure in that compartment. In an adjacent compartment, the pressure will decrease.

Alternatively and/or additionally, the material of another compartment may expand causing the compartment to expand. An adjacent compartment will then be subject to increased pressure since its relative size decreases. The first compartment is subject to lesser pressure since its relative size increases.

For instance, in FIG. 1 in one situation the walls 10 shrink or contract to some degree to increase the pressure in compartment 20. Also, the compartment 18 can have walls which contract or may increase the pressure therein. Relatively, however, 20 needs to contract more than 18 to have an overall increase in pressure in both compartments.

In another case, for instance in FIG. 8, in compartment 1032 the walls expand. This causes a pressure differential whereby the pressure from the compartment defined by walls 1020 forces fluid 1034 into the compartment 1032 under the increased pressure differential.

These same characteristics may be applicable also to other embodiments of the invention, for instance those illustrated in FIGS. 15–17 relating to the microprocessing through food which is contained in one or more containers as illustrated and described with regard to these figures.

In the embodiments, particularly those of FIGS. 12–17, shrinking or contracting of one or more of the components acts as a pump to force fluid from one component to another due to the reduced size of the component and/or the increased size of an adjacent component. In other situations, the expansion of one compartment relative to the other causes the same pumping effect. Because the fluid is forced under this increased pressure from one component to another, there is also the time change for food preparation. In other words, since the device acts in part as a pressure cooker-type arrangement, less time can be used to prepare the consumable product. The appropriate determination of pressure and time will be related to the particular food or liquid product being prepared. In this regard, the food or liquid product can have different degrees of solidity, different constituent characteristics, for instance, a milk product, a water containing product, a gelatin containing product or the like.

In FIGS. 26A and 26B there are shown constructions similar to that illustrated in FIG. 12. In the illustration of FIGS. 26A and 26B the walls 1112 of the compartment are relatively solid and selectively opaque so the contents within the wall is not visible to the user. Inside of the wall 1112 there is a collapsible wall 11 12a which contains the contents of liquid which are subject to reaction under the effect of the microwaves. In this manner, when the microwave causes the walls 11 12a to collapse as liquid is expelled from the container. This is not visible or alternatively does not affect the outer wall 1112 which remains relatively solid and unchanged. The wall 1112 in certain circumstances can be made transparent or semi-transparent if desired.

Figure 27:
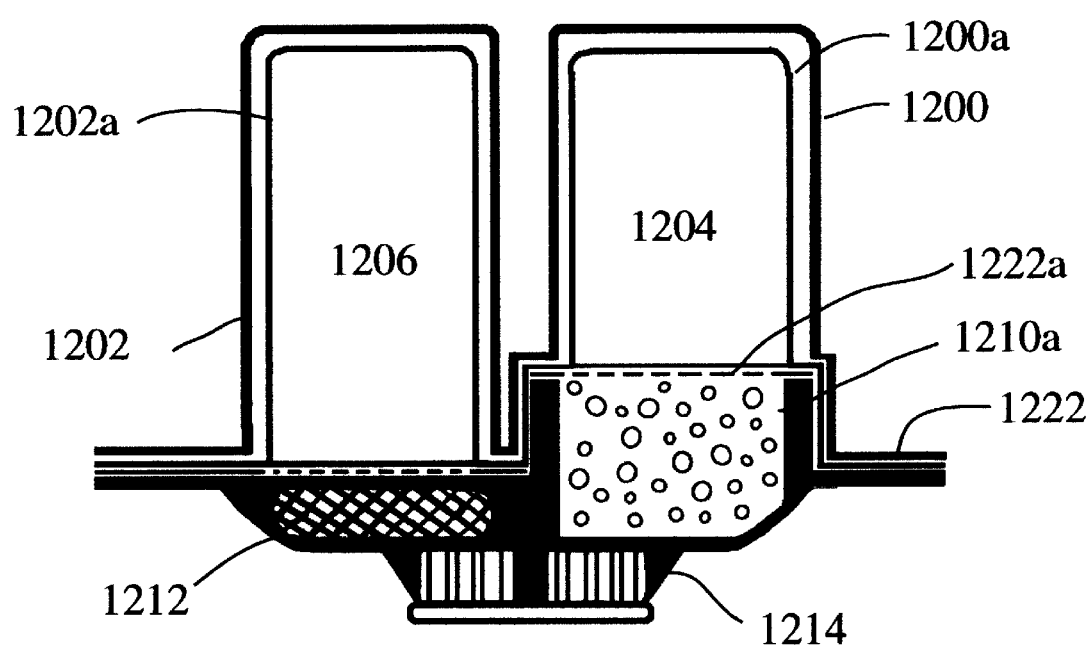
FIG. 27 is a sectional side view of a different device which has two separate compartments for containing two different components in the two compartments and for containing different liquid, granular or powder materials to be blended together. There is a hard shell or casing covering in each of those compartments. One compartment is of a different size relative to the other compartment and there is a different amount of liquid, granular, or powder material which can be contained in one compartment relative to the other compartment.

In FIG. 27 there is a similar arrangement where the walls 1200 and 1202 are relatively solid, and contained respectively within each of those compartments is a collapsible wall 1200a and 1202a which is subject to the reaction of microwaves. The powdered material 1210a forms a relatively larger size than that shown in the embodiment of FIG. 13 item 1210. It is also relatively larger than the compartment 1212 shown in FIGS. 13 and 27. In this manner, there is more granular material in compartment 1210a and accordingly the size of the compartments 1206 and 1204 in FIG. 27 are relatively different. The partition 1222a for compartment 1204 is placed higher up and more removed from the element 1214 to accommodate this change in size. Different amounts of fluid are contained in compartments 1204 and 1206. Different combinations of relative compartment size for fluid, powders, and granular materials are possible. The compartments 1210a and 1212 can be sealed with an appropriate cover at their outlets.

Figure 28:
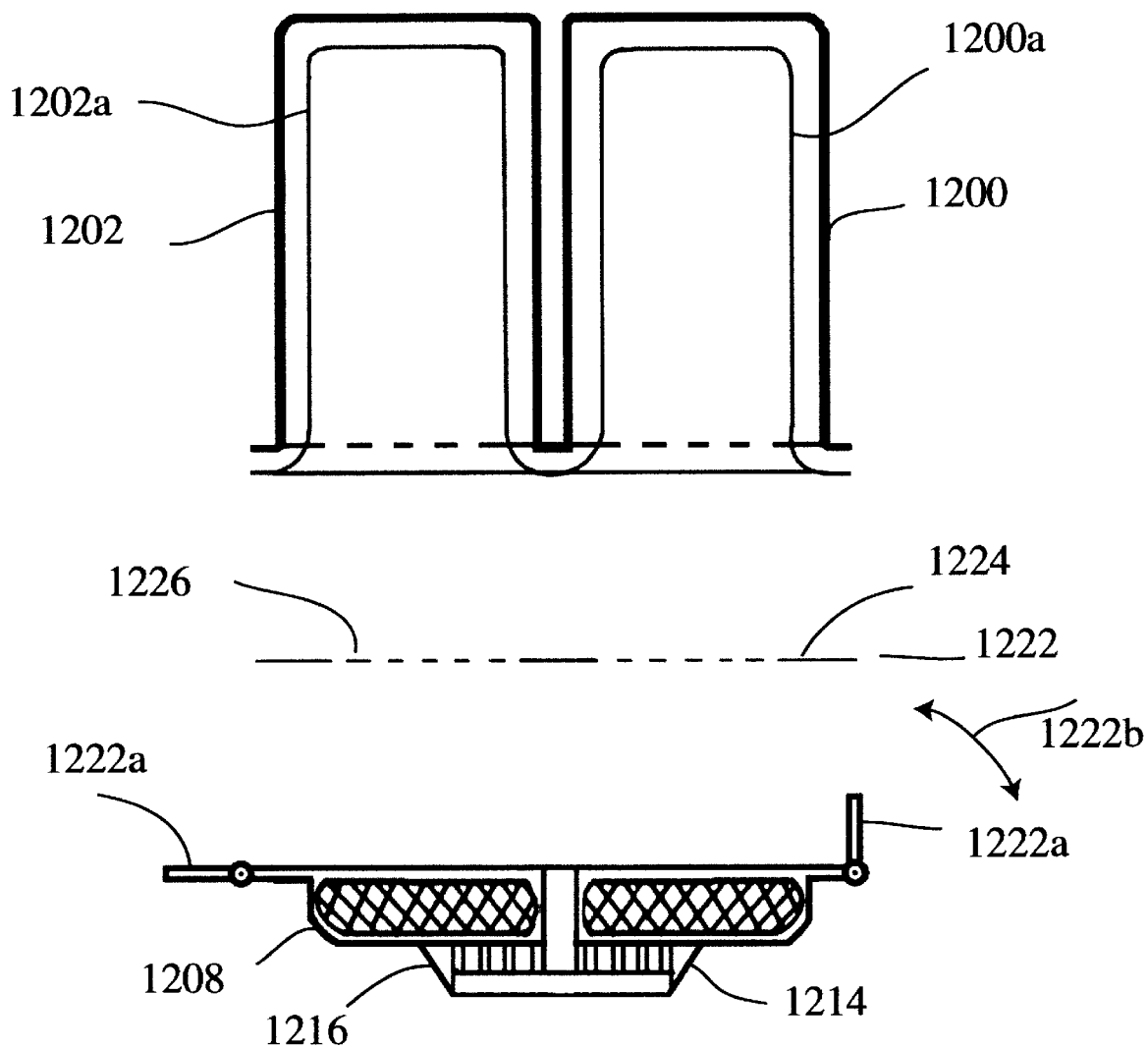
FIG. 28 is a cross-sectional view of a different device which has two separate components for containing two liquids in two compartments and wherein collapsible containers are contained within hardened cases or shells and wherein the filtering component has a moveable wing acting as a locking agent.

As illustrated in FIG. 28 there is a configuration with the collapsible walls 1200a and 1202a, each of those walls respectively being covered by the more solid constructions 1200 and 1202. The filtering with separation element includes a pivotable wing component 1222a which is movable as indicated by arrow 1222b. Such wings can be provided on both sides of the separation element, as is shown in FIG. 26A. These wings can be used to lock the various elements together.

In FIGS. 29a and 29b the wall 1020a is relatively solid and not subject to the reaction of microwaves. Wall 1020 is collapsible under the action of microwaves. Wall 1020a may be opaque, transparent, partly transparent or selectively may have a window in the wall so that the contents inside, namely the wall 1020 can be seen through wall 1020a.

The filtering mechanism 1042a is of a relatively smaller diameter than the comparative filtering mechanism 1042 as shown in FIG. 8a and FIG. 8b. Suitable radial elements 1024b are directed to support the filtering element 1042a from the circumferential outside towards the central location or around the periphery of the filtering element 1042a and to provide locking together of the various components.

Figure 30:
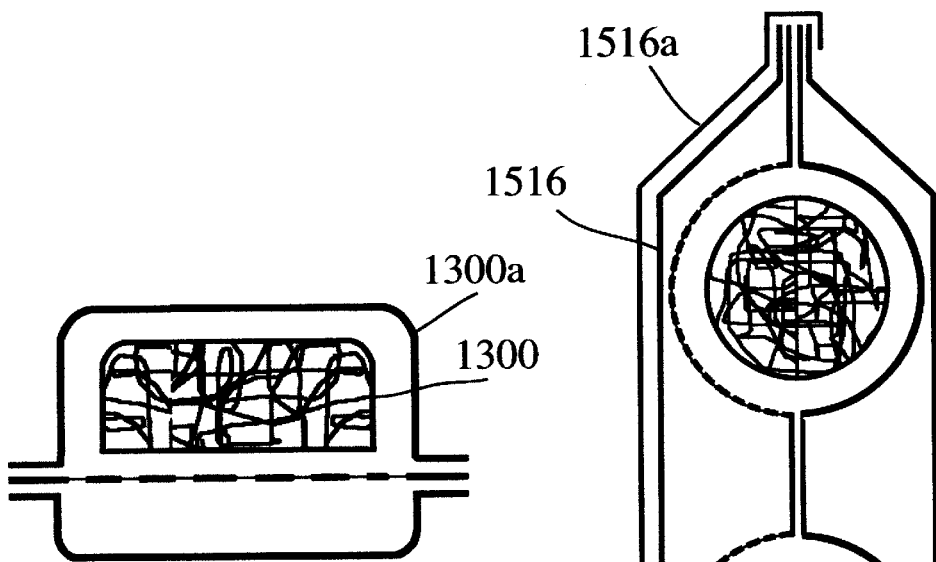
FIG. 30 is a side view of a device for preparing a solid food component in which at least one of the cells or zones includes an additional casing which can be opaque and or transparent and which is not subject to reaction such as collapse due to the microwave action on the contents of the cells or zones.
Figure 31:
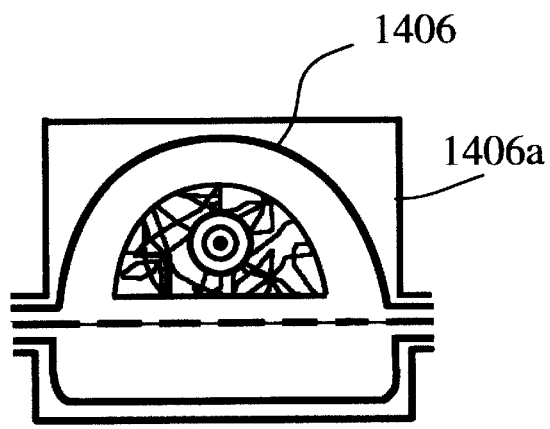
FIG. 31 is a side view of a different configuration for preparing a vegetable product a relatively rigid and selectively opaque casing covers the collapsible inner skin of one of the cells.
Figure 32:
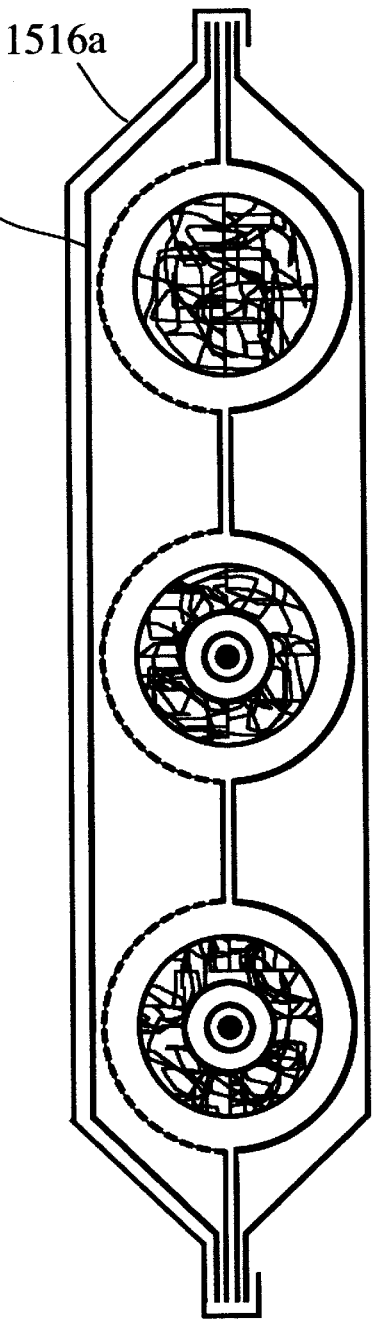
FIG. 32 is a sectional side view of another device for making different components wherein the multiple cells are covered by one or more hard and selectively opaque elements which are not subject to contraction in the manner that the internal cells and the components therein are subject.

FIG. 30 illustrates a technique for treating different elements under the action of microwaves where there is a further casing 1300a provided about the cell 1300 within which there is a further container for the food. The wall 1300a may be opaque, transparent, semitransparent or may have a suitable window. Ideally the wall 1300a does not collapse under the action of microwaves and as such when the food is being processed in the microwave it is not visible to the naked eye until the wall and or/casing 1300a is removed. In FIG. 31 there is shown a similar wall 1406a which surrounds the wall 1406. This wall 1406a may have similar characteristics to that illustrated for wall 1 300a in FIG. 30. In FIG. 32 there is a wall 151 6a which has similar characteristics as the walls 1406a and 1 300a.

In FIGS. 33, 34 and 35 there is shown a configuration where there is a solid wall 1112 and a collapsible wall 1112a. Between these walls there are a series of granules, pellets or cells 1112b. These expandable elements react to microwaves. The configuration is shown in FIG. 34 which shows the cells 1 112b in the unexpanded form and the walls 11 12a and 1112 in their normal state prior to subjection of microwaves. Fluid is contained in the cavity 1102. Under microwave action, the pellets 11 12b expand as shown in FIG. 33 and expand further as shown in FIG. 35. In the substantially fully expanded position the wall 1 112a is collapsed to be substantially adjacent to the separation filter 1104 or the base 1114 of the container. This acts to force fluid from the container portion 1102 through the components 1108 and 1120 to a container or reservoir on the opposite side.

Figure 36:
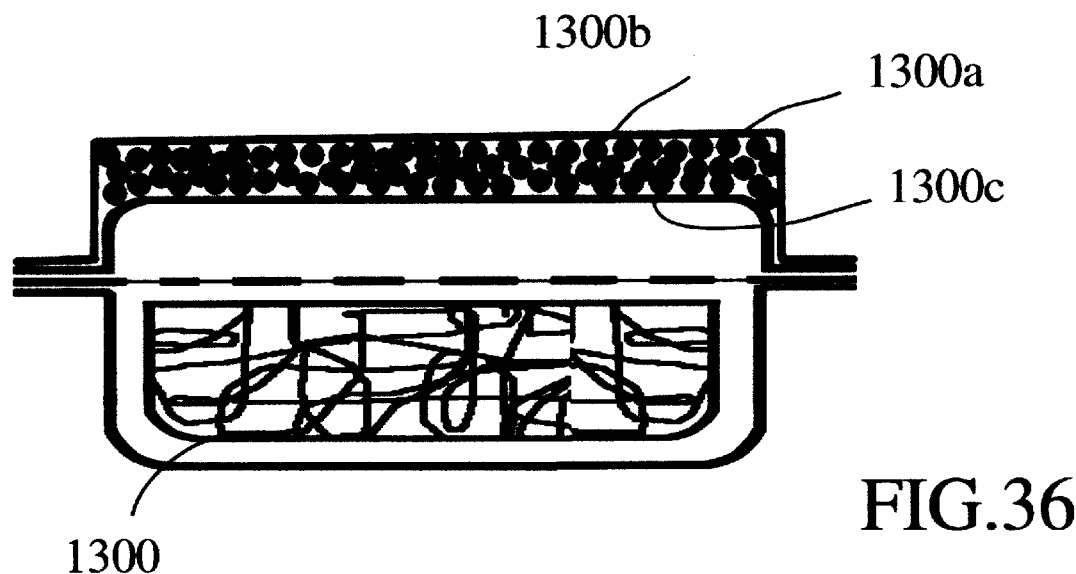
FIG. 36 is a cross-sectional view of a configuration for preparing food components wherein there are cells expandable under microwave action thereby forcing one compartment to reduce in size.
Figure 37:
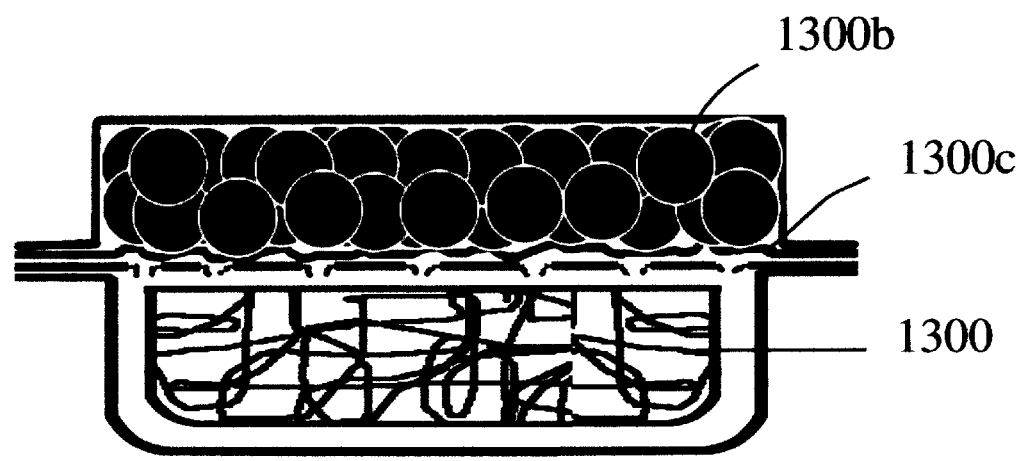
FIG. 37 is a cross-sectional view of the embodiment of FIG. 36 showing the cells expanded and a compartment contracted thereby to cause the forcing of fluid from the contracted compartment into the other compartment.

As shown in FIGS. 36 and 37 there is a configuration which similarly uses expandable pellets or cells 1300b. There is the collapsible wall 1300c and the pellets 1300b are disposed between that wall and an outer wall 1 300a.

As shown in FIG. 37 the cells 1300b are expanded and the wall 1300c has collapsed to be adjacent the division and closer to the vegetable, meat or other food component within the walls 1300.

The cells 11 12b and 1 300b can be made of any suitable expandable material which is capable of expanding under heat. As such, any suitable resin, gaseous liquid or other cell material can be used. Examples of such materials can be polystyrene, polypropylene type, or other plastic materials. The nature of the materials is that they do not adversely impact food or liquids or other consumable products. The materials can be formed so as to gradually expand. Thus there can be a delayed reaction so that after the liquid and/or food in other compartments is heated, the expansion of the cells takes place to force heated liquid or fluid through a filter or partition. Likewise there can be a progression in the expansion so that the space filled by the cells gradually fills up and the liquid is gradually forced through the partition. The invention is to be determined solely by the following claims.

The invention is to be determined by the following claims

I claim:

1. A disposable device for use in a microwave oven for making a coffee-based espresso-like beverage comprising:

multiple fluid containing compartments, the compartments being formed of a material having a substantially non-deleterious reaction to microwave action;

a consumable coffee beverage product including at least two components which are separated in the compartments prior to being subjected to microwave action, one component, being water, in a first compartment, and the second component being coffee granules;

a divider for keeping the components separate prior to microwave action, wherein the divider is a filter, and wherein the filter has a predetermined series of apertures;

wherein the effect of microwave action on the water component acts to break the divider separating the components and causes the water component to be forced through the coffee granules under pressure caused by the effect of the microwaves on the water and to extract, under pressure caused by the microwaves, essence and flavor from the coffee granules to a desired degree, and thereby provide a desired consumable espresso-like based coffee beverage in a second compartment normally empty prior to microwave action;

wherein the material forming one or more compartments shrinks or increases in size under heat caused by the microwave relative to an adjacent compartment, thereby causing a relative increase in pressure in one compartment related to that material, thereby to increase the pressure by which water is forced under microwave action through the granules into the compartment to contain the beverage after microwave action; and a substantially non-shrinkable and selectively at least partly opaque member about at least the one component.

2. A device as claimed in claim 1 wherein another compartment is for containing a dry coffee product contained in a filtering medium.

3. A device as claimed in claim 1 wherein the divider is an element for location between compartments, and the compartments are cylindrical elements located with open ends in an end to end relationship with a divider element between them and a dry component being contained in the divider element.

4. A device as claimed in claim 1 wherein, prior to microwaving, the compartments are sealed with the ingredient components separated, the compartments being separable after microwaving, and the second of the compartments is a delivery means for the coffee beverage product to the consumer.

5. A device as claimed in claim 1 wherein one of the multiple compartments is for containing a dairy product, the dairy product selectively being in a liquidized form, and the dairy product is selectively a non-fat milk or other milk product suitably processed so as not to deteriorate in the environment.

6. A device as claimed in claim 1 wherein the components include a milk product in another compartment, and whereby under microwaving the components blend to make cappuccino or other dairy containing espresso-based coffee product.

7. A device as claimed in claim 1 wherein one component of the device includes a cup.

8. A device as claimed in claim 1 wherein one of the compartments is a drinking cup, the drinking cup being a separate element for cooperating with at least one of the other compartments, thereby permitting the making the hot beverage in the drinking cup.

9. A device as claimed in claim 1 wherein at least one of the compartments is made selectively of plastic, paper, pressboard, cardboard or laminated components.

10. A device as claimed in claim 1 wherein there is a space between the non-shrinkable member and a selectively partly-opaque non-shrinkable member and wherein the space contains expandable cells, elements or components, the expansion of such cells, elements or components being such as to increase the space between the shrinkable member and the non-shrinkable member and thereby force liquid or other fluids from the one component through the divider, the expansion being affected under the action of microwaves.

11. A disposable device for use in a microwave oven for making a coffee-based espresso-like product comprising:

multiple fluid containing compartments, the compartments being formed of a material having a substantially non-deleterious microwave action;

a consumable coffee beverage product including at least two components which are separated in the compartments prior to being subjected to microwave action;

a divider for keeping the components separate prior to microwave action the divider is an element for location between compartments, and the compartments are cylindrical elements located with open ends in an end to end relationship with a divider element between them and a dry component being contained in the divider element;

wherein the effect of microwave action on the water component acts to break the divider separating the components and causes the water component to be forced through the coffee granules under pressure caused by the effect of the microwaves on the water and to extract, under pressure caused by the microwaves, essence and flavor from the coffee granules to a desired degree, and thereby provide a desired consumable espresso-like based coffee beverage in a second compartment normally empty prior to microwave action;

wherein one of the compartments is for containing water prior to microwaving, another compartment is for containing a dry coffee product contained in a filtering medium, and a third compartment is for receiving a coffee liquid product after microwaving, the liquid having passed from the first compartment, through the filtering medium and into the third compartment;

wherein another compartment is for containing a dairy product to be added to the coffee product under steam pressure caused by microwaves thereby to provide a coffee-based espresso-like beverage containing steamed milk;

wherein the material forming one or more compartments shrinks or increases in size under heat caused by the microwave relative to an adjacent compartment, thereby causing a relative increase in pressure in one compartment related to that material, thereby to increase the pressure by which water is forced under microwave action through the granules into the compartment to contain the beverage after microwave action, and a substantially non-shrinkable and selectively at least partly opaque member about at least the one component.

12. A device as claimed in claim 11 wherein there is a space between the non-shrinkable member and a selectively partly-opaque non-shrinkable member and wherein the space contains expandable cells, elements or components, the expansion of such cells, elements or components being such as to increase the space between the shrinkable member and the nonshrinkable member and thereby force liquid or other fluids from the one component through the divider, the expansion being affected under the action of microwaves.

13. A device for use in a microwave oven for making an essence or flavored beverage comprising:

a water containing compartment, the compartment being formed of a material having a substantially non-deleterious reaction to microwave action, one component, being water, contained in the water containing compartment, and a second component, being a powder or granules;

a consumable beverage product including at least two components which are separated prior to being subjected to microwave action;

a divider for the compartment for keeping the components separate prior to microwave action;

wherein the effect of microwave action on the water component acts to break the divider separating the components and causes the components to mix to a desired degree, and thereby provide a desired consumable beverage, the water being treated under microwaves, thereby causing an increased pressure to break the divider of the compartment and the heated water to be urged under pressure through the powder or granules, and thereby making the consumable beverage;

wherein the material forming one or more compartments shrinks or increases in size under heat caused by the microwave relative to an adjacent compartment, thereby causing a relative increase in pressure in one compartment related to that material, thereby to increase the pressure by which water is forced under microwave action through the granules into the compartment to contain the beverage after microwave action; and a substantially non-shrinkable and selectively at least partly opaque member about at least the one component.

14. A device as claimed in claim 13 wherein the divider is a filter, and wherein the filter has a predetermined series of apertures.

15. A device as claimed in claim 13 including multiple compartments and one of the multiple compartments being for containing a dry coffee product.

16. A device as claimed in claim 13 wherein, prior to microwaving, the compartments are sealed with the ingredient components separated, the compartments being separable after microwaving, and one of the compartments being a delivery means for the beverage product to the consumer.

17. A device as claimed in claim 13 wherein there are multiple compartments, and wherein one compartment is for containing water, and one of the multiple compartments is for containing a dairy product, and another of the multiple compartments is for containing a dry coffee product.

18. A device as claimed in claim 13 wherein the granules or powder is selectively coffee, tea, soup, flavoring, vegetable or fruit concentrate.

19. A device as claimed in claim 13 wherein the compartment includes multiple components and wherein one component of the device includes a cup which is optionally fitted to form as part of the integral device when used in the microwave oven.

20. A device for use in a microwave oven comprising:

multiple fluid containing compartments, the compartments being formed of a material having a substantially non-deleterious reaction to microwave action, and wherein one of the components is water;

a consumable beverage product including at least two components which are separated in the compartments prior to being subjected to microwave action;

a divider for keeping the components separate prior to microwave action; and wherein the effect of microwave action on water the component acts to break the divider separating the components and causes the components to mix to a desired degree, and thereby provides a desired consumable beverage, the water being treated under microwaves, thereby causing an increased pressure to break the divider of the compartment and the heated water to be urged under pressure through the powder or granules, and thereby making the consumable beverage;

wherein the material forming one or more compartments shrinks or increases in size under heat caused by the microwave relative to an adjacent compartment, thereby causing a relative increase in pressure in one compartment related to that material, thereby to increase the pressure by which water is forced under microwave action through the granules into the compartment to contain the beverage after microwave action; and a substantially non-shrinkable and selectively at least partly opaque member about at least the one component.

21. A device for use in a microwave oven for making a food product comprising:

multiple fluid containing compartments, the compartments being formed of a material having a substantially non-deleterious reaction to microwave action;

a consumable food product including at least two components which are separated in the compartments prior to being subjected to microwave action, one component, being water, in a first compartment, and the second component being food product;

a divider for keeping the components separate prior to microwave action, wherein the divider is a filter, and wherein the filter has a predetermined series of apertures;

wherein the effect of microwave action on the water component acts to break the divider separating the components and causes the water component to be forced through the food product under pressure caused by the effect of the microwaves on the water and to extract, under pressure caused by the microwaves, essence and flavor from the food product to a desired degree, and thereby provide a desired consumable food;

wherein the material forming one or more compartments shrinks or increases in size under heat caused by the microwave relative to an adjacent compartment, thereby causing a relative increase in pressure in one compartment related to that material, thereby to increase the pressure by which water is forced under microwave action through the food product; and a substantially non-shrinkable and selectively at least partly opaque member about at least the one component.

22. A device as claimed in claim 21 wherein another compartment is for containing a dry product.

23. A device as claimed in claim 21 wherein, prior to microwaving, the compartments are sealed with the ingredient components separated, the compartments being separable after microwaving, and the second of the compartments is a delivery means for the food product to the consumer.

24. A device as claimed in claim 21 wherein one of the multiple compartments is for containing a dairy product, and the dairy product is selectively in a liquidized form, the dairy product is selectively a non-fat milk or other milk product suitably processed so as not to deteriorate in the environment.

* * * * *